US012785171B2

(12) United States Patent
Sasaki et al.

(10) Patent No.: US 12,785,171 B2
(45) Date of Patent: Nov. 3, 2026

(54) COOLING STRUCTURE BETWEEN BATTERY CELLS, BATTERY MODULE, AND, BATTERY PACK

(71) Applicant: NIPPON STEEL CORPORATION, Tokyo (JP)

(72) Inventors: Kohei Sasaki, Tokyo (JP); Masaharu Ibaragi, Tokyo (JP); Masafumi Usui, Tokyo (JP); Tatsunori Sunagawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 594 days.

(21) Appl. No.: 18/276,406

(22) PCT Filed: Mar. 31, 2022

(86) PCT No.: PCT/JP2022/016820

§ 371 (c)(1),
(2) Date: Aug. 8, 2023

(87) PCT Pub. No.: WO2022/215659

PCT Pub. Date: Oct. 13, 2022

(65) Prior Publication Data

US 2024/0120573 A1 Apr. 11, 2024

(30) Foreign Application Priority Data

Apr. 6, 2021 (JP) ................................ 2021-064836

(51) Int. Cl.
*H01M 10/6555* (2014.01)
*H01M 10/613* (2014.01)
(Continued)

(52) U.S. Cl.
CPC ..... *H01M 10/6555* (2015.04); *H01M 10/613* (2015.04); *H01M 10/625* (2015.04);
(Continued)

(58) Field of Classification Search
CPC .......... H01M 10/6555; H01M 10/613; H01M 10/625; H01M 10/653; H01M 10/658;
(Continued)

(56) References Cited

U.S. PATENT DOCUMENTS 9,865,906 B2 1/2018 Dudley et al.
9,991,479 B2 6/2018 Harayama et al.
(Continued)

FOREIGN PATENT DOCUMENTS

CN 105489965 A 4/2016
CN 108598625 A * 9/2018 .......... H01M 10/625
(Continued)

OTHER PUBLICATIONS

Incropera et al., "Fundamentals of Heat and Mass Transfer", 7th Ed., 2011 (Year: 2011).*
(Continued)

*Primary Examiner* — Jimmy Vo
(74) *Attorney, Agent, or Firm* — Birch, Stewart, Kolasch & Birch, LLP

(57) ABSTRACT

There is provided a cooling structure between battery cells which allows a temperature rise of adjacent battery cells to be restrained more efficiently even for an appearance of an abnormally heat-generating battery cell. A cooling structure between battery cells disposed side by side so that two side surfaces face each other, the cooling structure between the battery cells includes, formed of plate-shaped metal members each having a thermal conductivity of 100 W/m·K or more and a thickness of 0.3 mm or more, and being in contact with the respective facing side surfaces of the adjacent battery cells, and a heat insulating layer disposed between the plate-shaped metal members, and having a thermal conductivity of 1.0 W/m·K or less and a thickness of 0.5 mm or more, a multi-layer structure of cell/metal
(Continued)

member/heat insulating layer/metal member/cell, and the cooling structure further includes a cooling member present in the vicinity of the plurality of battery cells, wherein one end portion of each of the plate-shaped metal members is in contact with the cooling member.

27 Claims, 15 Drawing Sheets

(51) Int. Cl.

*H01M 10/625* (2014.01)
*H01M 10/653* (2014.01)
*H01M 10/658* (2014.01)
*H01M 50/209* (2021.01)
*H01M 50/249* (2021.01)
*H01M 50/258* (2021.01)

(52) U.S. Cl.

CPC ....... *H01M 10/653* (2015.04); *H01M 10/658* (2015.04); *H01M 50/209* (2021.01); *H01M 50/249* (2021.01); *H01M 50/258* (2021.01)

(58) Field of Classification Search

CPC . H01M 50/249; H01M 50/209; H01M 50/258
See application file for complete search history.

(56) References Cited

U.S. PATENT DOCUMENTS

| | | | |
|---|---|---|---|
| 2010/0104935 | A1 | 4/2010 | Hermann et al. |
| 2011/0159340 | A1 | 6/2011 | Hu et al. |
| 2012/0270075 | A1 | 10/2012 | Fujimura |
| 2016/0268655 | A1 | 9/2016 | Takamatsu et al. |
| 2019/0006642 | A1 | 1/2019 | Sakaguchi et al. |
| 2020/0365855 | A1 | 11/2020 | Murayama et al. |
| 2020/0411818 | A1 | 12/2020 | Takeda |

FOREIGN PATENT DOCUMENTS

| | | | | |
|---|---|---|---|---|
| FR | 3 100 387 | A1 | | 3/2021 |
| JP | 2010-108932 | A | | 5/2010 |
| JP | 2014-89822 | A | | 5/2014 |
| JP | 2014089822 | A | * | 5/2014 |
| JP | 2014-229559 | A | | 12/2014 |
| JP | 2015-76187 | A | | 4/2015 |
| WO | WO 2015/041149 | A1 | | 3/2015 |
| WO | WO 2017/159527 | A1 | | 9/2017 |
| WO | WO 2019/167612 | A1 | | 9/2019 |
| WO | WO 2019/167689 | A1 | | 9/2019 |
| WO | WO 2021/166346 | A1 | | 8/2021 |

OTHER PUBLICATIONS

CN_108598625 English Translation (Year: 2018).*
JP_2014089822_A English Translation (Year: 2014).*

* cited by examiner

COOLING STRUCTURE BETWEEN BATTERY CELLS, BATTERY MODULE, AND, BATTERY PACK

TECHNICAL FIELD

The present invention relates to a cooling structure between battery cells, a battery module, and, a battery pack.

BACKGROUND ART

An electric vehicle uses many battery cells (for example, lithium-ion secondary cells or the like) to obtain a large power storage capacity and a high output. In the battery cell, a cylinder shape, a square shape, a laminate type, or the like is present, and as the electric vehicle, the square shape having high mechanical strength and a good balance between energy density, sizes, and the like is mainly employed. The electric vehicle using the square-shaped battery cell (hereinafter, also simply referred to as a "battery cell".) uses a plurality of battery modules each constituted by closely arranging many battery cells in parallel or in series in a limited space, and these battery modules are connected to be a battery pack, which is mounted on a vehicle. The battery cell generates a large amount of heat in the process of repeating charge and discharge, and the above situation remains as it is, which hastens progress of deterioration, and thus in the battery module, a structure or a mechanism in which the battery cells are cooled by air cooling, water cooling, or the like is provided.

However, even though such a cooling structure or a cooling mechanism is provided, the deterioration of the battery cell in the process of repeating charge and discharge, application of heat or impact from the outside, or the like sometimes causes a part of the battery cells to abnormally generate heat. In this case, a large amount of heat transfers from the abnormally heat-generating battery cell to the adjacent battery cells, and propagation of such heat damages all the battery modules. As countermeasures thereagainst, for example, Patent Document 1 discloses a technique of restraining the damage to the battery module by providing an inter-cell separator between adjacent battery cells. As an example of the inter-cell separator in this document, a stacked structure of heat insulating member/heat conductive member/heat insulating member is described. This allows the heat transfer between the adjacent cells to be restrained by the heat insulating members, and moreover, contact of an end portion of the heat conductive member and a lower portion of the battery cell with a cooling plate or the like transfers and disperses the heat caused by abnormal heat generation to other portions to restrain the propagation of the abnormal heat generation.

PRIOR ART DOCUMENT

Patent Document

Patent Document 1: International Publication WO 2019/167689

Patent Document 2: International Publication WO 2019/167612

Patent Document 3: Chinese Patent Publication No. 105489965

DISCLOSURE OF THE INVENTION

Problems to be Solved by the Invention

However, in recent years, a higher energy density of the battery cell for electric vehicle further increases a temperature rise of the heat-generating cell, which easily propagates heat between the adjacent cells, in the abnormal heat generation. Thus, heat-transfer control technique (cooling technique) of restraining the damage to the battery module at the time of abnormal heat generation has been desired more than ever before.

On the other hand, for lower cost of the battery module, a trend from an aluminum base such as an aluminum alloy to an iron base such as steel in a material of a casing of the battery cell also partially occurs. The iron-based material is about one fifth to one tenth lower in thermal conductivity as compared with the aluminum based material. Thus, the use of the iron-based material for the casing makes it difficult to transfer and disperse the heat from the abnormally heat-generating battery cell to other portions through the cooling plate even for use of the battery module having a higher cooling capability by bringing a battery case into contact with the cooling mechanism such as the cooling plate.

Further, the iron-based material is higher in melting point than the aluminum-based material. Due to higher energy in the battery cell for electric vehicle in recent years, a maximum temperature in the abnormal heat generation sometimes reaches even 700 to 800° C. or more to exceed the melting point of the aluminum-based material (about 660° C.), and raises the possibility of causing a very dangerous situation such as melting down of the casing itself. However, in the iron-based material having a melting point of about 1500° C., such melting down of the casing does not occur, and thus the iron-based material can be said to be higher in safety than the aluminum-based material.

Hence, the present invention has been made in consideration of the above problems, and an object of the present invention is to provide a cooling structure between battery cells, and, a battery module having the cooling structure between the battery cells, and, a battery pack which allow the temperature rise of the adjacent battery cells to be restrained more efficiently as compared with conventional techniques even for an appearance of the abnormally heat-generating battery cell, and even for the iron base such as a steel material as the material of the casing of the battery cell at that time.

Further, between the battery cells, a smaller spacing therebetween enables more compact design of the battery pack and the battery module, which is preferable in terms of a size reduction. On the other hand, considering in terms of prevention of the abnormal heat generation, ease of installation of a cooling structure, and the like, a spacing to some extent is necessary. Thus, the spacing between the battery cells is required to be designed in consideration of a balance therebetween, and the spacing is designed to be different for each kind of the battery.

Accordingly, a main object of the present invention is, in the above-described problems, in particular, under a condition of the same spacing between the battery cells, to provide the cooling structure between the battery cells, and, the battery module having the cooling structure between the battery cells, and, the battery pack which allow the temperature rise of the adjacent battery cells to be restrained more efficiently as compared with the conventional techniques.

Note that for the battery cell, the prevention of the abnormal heat generation is important, and thus the aluminum-based material excellent in thermal conductivity is generally used for the casing, which has not been able to cause such problems as described above. Such problems as described above are not able to arise until the iron-based material is intended to be used for the casing.

Means for Solving the Problems

The present inventors have conceived, as a result of making intensive studies for solving the above-described problems, that between adjacent battery cells, a multi-layer structure of "a layer of a metal member, having a high thermal conductivity, in thermal contact with a side surface of one of the battery cells/an interposed heat insulating layer/a layer of a metal member, having a high thermal conductivity, in thermal contact with a side surface of the other of the battery cells" (hereinafter, is sometimes abbreviated as an "A structure".) is provided, a predetermined thickness is set for each of the layers, and one end of the metal member having a high thermal conductivity is connected to a cooling mechanism. They have found that this allows rising temperature of the adjacent battery cells to be lowered more efficiently than conventional techniques even for an appearance of an abnormally heat-generating battery cell.

Further, under the above-described conditions, in place of the A structure, a case of, between adjacent battery cells, providing a multi-layer structure of "a layer of a heat insulating member in thermal contact with a side surface of one of the battery cells/an interposed layer of a member having a high thermal conductivity/a layer of a heat insulating member in thermal contact with a side surface of the other of the battery cells" (hereinafter, is sometimes abbreviated as a "B structure".) has also been studied. Thereafter, both the above-described A structure and B structure have been compared.

As a result, it also has been found that in an initial stage of the abnormal heat generation, between the A structure and the B structure, there is little difference in cooling capability, but the passage of time causes the difference, and use of the A structure is higher in cooling capability as compared with use of the B structure. Further, it also has become clear that in the A structure, setting a thickness of each of the members to be equal to or more than a predetermined value further improves the cooling capability than that in a case of providing the layer of the member simply having a high thermal conductivity in a single layer between the battery cells.

Moreover, in focusing attention on heat resistance at a contact interface between the battery cell and the metal member, it also has become clear that controlling the ratio between a heat resistance value at the contact interface and a heat resistance value of the metal member to be equal to or less than a predetermined value further improves the cooling capability, which is preferable.

Note that the aforesaid Patent Document 2 discloses a structure similar to the above-described A structure, but such Patent Document 2, in which the invention is intended for reflection of an electromagnetic wave, does not disclose such a viewpoint of conducting heat as attention is focused on by the present invention. Further, in the aforesaid Patent Document 2, a thickness of a heat insulating material is 0.1 to 3 mm, and the thickness of the heat insulating material is also smaller than that in the present invention described in detail below. It is also found from such a viewpoint that it is the reflection of the electromagnetic wave that attention is focused on in the aforesaid Patent Document 2, and heat is not intended to be conducted. Further, the aforesaid Patent Document 2 has no consideration for the control of the heat resistance at the contact interface.

Further, the aforesaid Patent Document 3 discloses an invention having an intention to conduct heat similarly to the present invention. The aforesaid Patent Document 3, in which a sheet such as a graphite sheet or foil is used as a heat conductive material, and its thickness is also very small to be 0.02 mm in an example, is different from the present invention. Further, the aforesaid Patent Document 3 has no consideration for the control of the heat resistance at the contact interface.

The gist of the present invention accomplished based on the above-described findings is as follows.

(1) In a plurality of square-shaped battery cells disposed side by side so that two side surfaces face each other, a cooling structure between the battery cells adjacent to each other, the cooling structure between the battery cells includes, formed, between the adjacent battery cells, of plate-shaped metal members each having a thermal conductivity of 100 W/m·K or more and a thickness of 0.3 mm or more, and being in thermal contact with the respective facing side surfaces of the adjacent battery cells, and a heat insulating layer disposed between the plate-shaped metal members in thermal contact with the respective facing side surfaces of the adjacent battery cells, and having at least either a heat insulating member or a gas layer having a thermal conductivity of 1.0 W/m·K or less and a thickness of 0.5 mm or more, a multi-layer structure of battery cell/plate-shaped metal member/heat insulating layer/plate-shaped metal member/battery cell, the cooling structure further includes a cooling member being in thermal contact with the plurality of respective square-shaped battery cells, or being present in a vicinity of the plurality of respective square-shaped battery cells, wherein at least one end portion of each of the plate-shaped metal members is in thermal contact with the cooling member; and the two plate-shaped metal members constituting the stacked structure are a same in thermal conductivity and thickness, and a thickness ratio of plate-shaped metal member/heat insulating layer/plate-shaped metal member is 1.0:0.2 to 4.0:1.0.

(2) The cooling structure between the battery cells according to (1), wherein: a side surface of the battery cell is composed of an iron and steel material, and when a heat resistance at a contact interface between the battery cell and the plate-shaped metal member is set as Rs, and a heat resistance of the plate-shaped metal member is set as Rm, $Rs/Rm \leq 3.0$ is obtained.

(3) The cooling structure between the battery cells according to (1) or (2), wherein: the plate-shaped metal members are in a substantially recessed shape by connecting lower portions of the plate-shaped metal members in thermal contact with respective side surfaces of the heat insulating members adjacent to each other; the plate-shaped metal members in the substantially recessed shape are inserted between the adjacent heat insulating members; and the battery cell is disposed in the recess in the substantially recessed shape.

(4) The cooling structure between the battery cells according to any one of (1) to (3), wherein the plate-shaped metal members are processed so that a cross-sectional shape is in a recessed shape, and are inserted between the battery cells adjacent to each other.

(5) The cooling structure between the battery cells according to any one of (1) to (4), wherein a thickness of the plate-shaped metal member is 0.5 mm or more, and a thickness of the heat insulating layer is 1.0 mm or more.

(6) The cooling structure between the battery cells according to any one of (1) to (5), wherein: in the plurality of respective square-shaped battery cells, a second plate-shaped metal member having a thermal conductivity of 100 W/m·K or more and a thickness of 0.3 mm or more is further present on a side surface in parallel with a direction in which the plurality of square-shaped battery cells are disposed side by side; and the second plate-shaped metal member is in thermal contact with the side surface of the battery cells, and at least one end portion is in thermal contact with the cooling member.

(7) The cooling structure between the battery cells according to any one of (1) to (6), wherein a spacing between the adjacent battery cells is 1.5 to 5.0 mm.

(8) The cooling structure between the battery cells according to any one of (1) to (7), wherein the plate-shaped metal member and the cooling member are in thermal contact with each other with an adhesive or grease having a thermal conductivity of 1.0 W/m·K or more therebetween.

(9) The cooling structure between the battery cells according to any one of (1) to (8), wherein the adhesive or the grease having the thermal conductivity of 1.0 W/m·K or more is an adhesive or grease cured at normal temperature.

(10) The cooling structure between the battery cells according to any one of (1) to (9), wherein: the cooling member is provided with a groove portion; and the plate-shaped metal member is fitted into the groove portion.

(11) The cooling structure between the battery cells according to any one of (1) to (10), wherein the square-shaped battery cells are constituted by stacking laminate-type battery cells.

(12) The cooling structure between the battery cells according to any one of (1) to (11), wherein a material of the plate-shaped metal member is at least any of aluminum, an aluminum alloy, copper, and a copper alloy

(13) A battery module comprising the cooling structure between the battery cells according to any one of (1) to (12).

(14) A battery pack comprising the cooling structure between the battery cells according to any one of (1) to (12).

Effect of the Invention

According to the present invention as described above, it becomes possible to restrain a temperature rise of the adjacent battery cells more efficiently as compared with conventional techniques under a condition of the same spacing between the battery cells even for the appearance of the abnormally heat-generating battery cell, and even for the iron base such as a steel material as a material of a casing of the battery cell at that time.

EMBODIMENTS FOR CARRYING OUT THE INVENTION

Hereinafter, preferred embodiments of the present invention will be described in detail while referring to the attached drawings. Note that in the present description and the drawings, constituent elements having substantially the same functional configurations are denoted by the same codes to omit overlapped explanation.

<Overall Structure of Cooling Structure Between Battery Cells>

Figure 1:
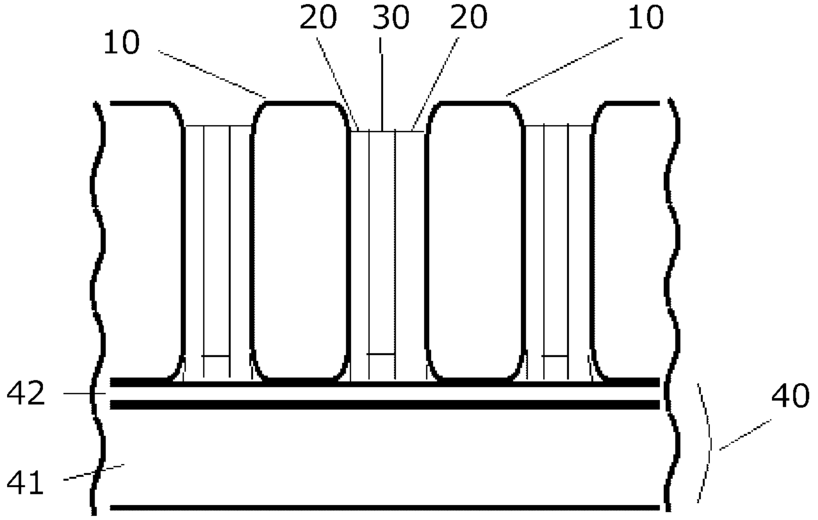
FIG. 1 is an explanatory view schematically illustrating a battery cell cooling structure (a sectional view in a battery module longitudinal direction) according to an embodiment of the present invention. (an example)

FIG. 1 is a schematic view illustrating one embodiment of a cooling structure (a sectional view in a battery module longitudinal direction) in the present invention. This cooling structure can reduce a temperature rise in battery cells adjacent to an abnormally heat-generating battery cell as compared with conventional cooling structures.

In the structure in FIG. 1, a plurality of square-shaped battery cells (hereinafter, the "square-shaped battery cell" is simply abbreviated as a "battery cell".) 10 the casing of each of which is made of iron or made of aluminum are disposed side by side so that two side surfaces (side surfaces having the largest area) included in the respective battery cells 10 face each other (in the figure, only a part of the cells is illustrated.). The battery cells may be ones constituted by stacking laminate-type battery cells.

With the respective side surfaces of the adjacent battery cells 10, plate-shaped metal members 20 (hereinafter, are each sometimes simply abbreviated as a "metal member 20".) each having a thermal conductivity of 100 W/m·K or more (normal temperature of 25° C. zone) and a thickness of 0.3 mm or more are in thermal contact. Thus, the two plate-shaped metal members 20 are adjacent to each other similarly to the adjacent battery cells 10. Between the two adjacent plate-shaped metal members 20, a heat insulating layer 30 having at least either a heat insulating member or a gas layer having a thermal conductivity of 1.0 W/m·K or less (normal temperature of 25° C. zone) and a thickness of 0.5 mm or more is present.

Here, in the embodiment of the present invention, "in thermal contact" is not limited to direct contact between two members, but also includes a state in which the two members are "connected to be capable of conducting heat" with another member interposed between the two members. Detail will be described later.

A spacing between the adjacent battery cells 10 is required to be as small as possible for making a battery module and a battery pack, composed of a plurality of battery cells, more compact and higher in density, and normally 10 mm or less. In this embodiment, when the spacing between the adjacent battery cells 10 is 1.5 mm or more, a difference in cooling effect from conventional techniques is larger.

Further, a lower end of the plate-shaped metal member 20 is in thermal contact with an upper surface of a cooling member 40 present under the battery cells 10. The cooling member 40 is constituted of a cooling plate 41 which carries out water cooling, and a thin heat transfer sheet 42 adhered thereon for electrical insulation in this embodiment. The cooling member 40 in thermal contact with the plate-shaped metal members 20 may be present in the vicinity of the battery cells 10, and may be present on an upper side thereof and on sides thereof other than on the lower side thereof. That is, through the presence of the cooling member 40 in the vicinity of the battery cells 10, end portions of the metal members 20 and the cooling member 40 only need to be present in a position allowing easy contact with each other. Further, the cooling member 40 may be in thermal contact with the battery cells 10 to directly cool the battery cells 10. In terms of improvement in cooling capability, the cooling member 40 is preferably present in more than one positions of the lower side, the upper side, and the sides. For example, in an example illustrated in FIG. 2, a case of providing a second plate-shaped metal member 60 positioned on the upper side of the battery cells 10, and a third plate-shaped metal member 70 positioned on the sides of the battery cells 10 in addition to the plate-shaped metal members 20 is illustrated. Further, for a simple structure, the plate-shaped metal members 20 are preferably present only on the lower side of the battery cells 10.

Further, preferably, as in FIG. 1, the battery cells 10 are favorable for being placed on the cooling member 40 present thereunder with lower surfaces of the battery cells 10 and the upper surface of the cooling member in thermal contact with each other.

Moreover, it is preferable that in each of the battery cells 10, the plate-shaped metal members 20 each having a thermal conductivity of 100 W/m·K or more and a thickness of 0.3 mm or more are in thermal contact with two surfaces of side surfaces each having the largest area (two surfaces on long sides), in addition to which, also with the two remaining side surfaces which are side surfaces in parallel with a direction in which the plurality of square-shaped battery cells 10 are disposed side by side (side surfaces extending in this direction) (two surfaces on short sides), and are in thermal contact with the upper surface of the cooling member 40 present thereunder (not illustrated.).

Note that moreover, the metal member 20 may be provided with a heat insulating member having a thermal conductivity of 1.0 W/m·K or less and a thickness of 1.0 mm or more (not illustrated.). In this case, the plate-shaped metal member 20 may be installed on each of the two surfaces on the short sides of each of the battery cells 10, or as in FIG. 2, the one plate-shaped metal member 20 may be installed on each of the surfaces on the two short sides of the battery cells 10 over all the battery cells 10 constituting the battery module.

With such a structure, when a part of the plurality of battery cells 10 starts abnormal heat generation, the heat can be dissipated through the metal member 20 to the cooling member 40 present in the vicinity thereof. Moreover, the heat insulating member restrains a transfer of the heat to the adjacent battery cells 10, which allows efficient restraint on the temperature rise of the adjacent battery cells 10.

In particular, in this cooling structure, even when a steel material is used as the casing of the battery cell 10 for lower cost and the like, and the side surface of each of the adjacent battery cells 10 is composed of an iron and steel material having a thermal conductivity one order of magnitude smaller than that of an aluminum material, the temperature rise of the adjacent battery cells 10 can be efficiently restrained. Thus, the application of this cooling structure to the battery cell using the steel material for the side surfaces of the cell causes a more significant difference in effect from the conventional techniques, which is preferable.

<Regarding Plate-Shaped Metal Member>

Dissipating the heat of the battery cell 10 starting the abnormal heat generation efficiently to the cooling member 40 present in the vicinity thereof requires the plate-shaped metal member 20 to have the thermal conductivity of 100 W/m·K or more and the thickness of 0.3 mm or more. In addition to superiority in relative cooling capability over the conventional techniques, in terms of further reducing a value of an ultimate temperature itself, the thickness of the plate-shaped metal member 20 is preferably 0.5 mm or more, and more preferably 1.0 mm or more. Meanwhile, the thickness of the plate-shaped metal member 20 is substantially set to about 5.0 mm as an upper limit though determined in consideration of the spacing between the adjacent battery cells 10 and the thickness of the heat insulating layer 30. The thickness of the plate-shaped metal member 20 is preferably 5.0 mm or less, and more preferably 2.0 mm or less. Further, the thermal conductivity is preferably 150 W/m·K or more.

Meanwhile, the thermal conductivity of the plate-shaped metal member 20 is substantially set to about 420 W/m·K as an upper limit. The plate-shaped metal member 20 further more preferably has the thickness of 1.0 mm or more, and the thermal conductivity of 150 W/m·K or more.

The thickness of the plate-shaped metal member 20 need not necessarily be a constant thickness, and a shape of the metal member may be a tapered one, a stepped one, or an irregular one. In a case of these shapes, as a value of the above-described plate thickness, an average value can be used. The average value of this plate thickness can be calculated as (a volume of the plate-shaped metal member 20)÷(a projected area of the plate-shaped metal member 20 from the plate thickness direction).

A material of the metal member is not particularly limited. However, from a balance between a high thermal conductivity and a low cost, as the material of the metal member, aluminum, an aluminum alloy, copper, or a copper alloy (including chalcopyrite.) is preferable.

A region of the metal member 20 in thermal contact with the side surface (side surface having the largest area) of the battery cell 10 may be partial, and is preferably 70% or more of an area of the side surface of the battery cell 10, and more preferably 90% or more thereof. Further, the temperature rise of the battery cell 10 at the time of abnormal heat generation is considered to be normally higher in a portion farther from the cooling member 40, and thus the metal member 20 is preferably in thermal contact from the portion farther from the cooling member 40. In the cooling structure in FIG. 1, the cooling member 40 is installed on the lower side, and thus the metal member 20 is preferably installed to be in thermal contact from an upper side of the side surface of the battery cell 10 as in FIG. 1. More concretely, in 90% or more of a vertical length of the side surface of the battery cell 10, the metal member 20 is more preferably installed to be in thermal contact therewith.

Figure 3A:
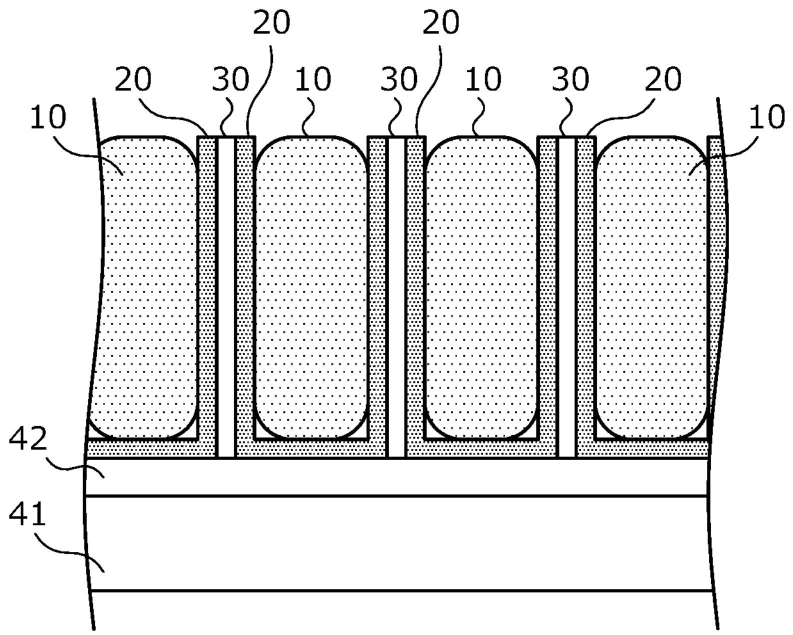
FIG. 3A is an explanatory view schematically illustrating another example of the battery cell cooling structure (a sectional view in the battery module longitudinal direction) according to the embodiment of the present invention. (an example)

Further, as in FIG. 3A, on condition that lower portions of the plate-shaped metal members 20 in thermal contact with respective side surfaces of the adjacent heat insulating members 30 are connected to each other to be in a recessed shape (in other words, on condition that a cross-sectional shape of the plate-shaped metal members 20 is in a recessed shape), such metal members 20 may be inserted between the adjacent heat insulating members 30, thereafter further installing the battery cell 10 in the recess of the plate-shaped metal members 20. In such a manner as described above, only the insertion, between the adjacent heat insulating members 30, of the metal members 20 in which the battery cell 10 has been installed enables a desired heat-insulating state, which further improves productivity.

Figure 3B:
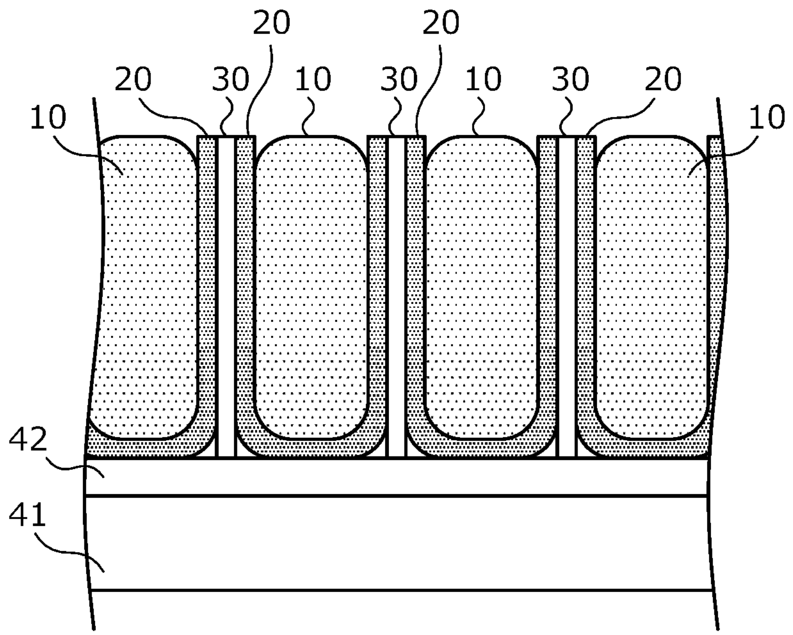
FIG. 3B is an explanatory view schematically illustrating another example of the battery cell cooling structure (a sectional view in the battery module longitudinal direction) according to the embodiment of the present invention. (an example)

At this time, corner portions of the metal members 20 in the recessed shape may each have a right angle as illustrated in FIG. 3A, or may each be in a curved state as illustrated in FIG. 3B.

<Regarding Heat Insulating Layer>

Restraining a transfer of heat to the adjacent battery cells 10 in the abnormal heat generation of a part of the battery cells 10 requires the heat insulating layer 30 to have the thermal conductivity of 1.0 W/m·K or less and a thickness of 0.5 mm or more. A higher heat insulating capability of the heat insulating layer 30 allows an initial temperature rise to be further restrained in the battery cells adjacent to the abnormally heat-generating battery cell. Thus, from the viewpoint of restraining the initial temperature rise, the thermal conductivity of the heat insulating layer 30 is preferably 0.1 W/m·K or less, and further preferably 0.06 W/m·K or less. Note that the thermal conductivity of the heat insulating layer 30 is substantially set to about 0.02 W/m·K as a lower limit. Similarly, from the viewpoint of restraining the initial temperature rise, the thickness of the heat insulating layer 30 is preferably 1.0 mm or more, and more preferably 1.5 mm or more. Meanwhile, the thickness of the heat insulating layer 30 is substantially set to about 10.0 mm as an upper limit though determined in consideration of the spacing between the adjacent battery cells 10 and the thickness of the plate-shaped metal member 20. The thickness of the heat insulating layer 30 is preferably 5.0 mm or less, and more preferably 2.0 mm or less.

A material of the heat insulating layer 30 is not particularly limited, and a heat insulating member of glass wool, rock wool, polyurethane foam, foam rubber, nonwoven fabric, a resin such as polystyrene, polypropylene, or polybutylene terephthalate, or the like can be used. Further, the heat insulating layer 30 may be a gas layer in which a gas such as air is present in space. Moreover, the heat insulating layer 30 may use such a member capable of holding a gas layer as, for example, a porous member or the like, resulting in making the gas such as air present inside pores thereof, between the adjacent metal members 20.

The heat insulating layer 30 only needs to be present between the two adjacent plate-shaped metal members 20. When the heat insulating member is used as the heat insulating layer 30, the heat insulating layer (heat insulating member) 30 may be in contact with the metal members 20 or apart from them while having a void. Further, one of the side surfaces of the heat insulating layer (heat insulating member) may be in contact with the metal member 20, and the other of the side surfaces thereof may be apart from the metal member 20 while having the void. When the heat insulating member 30 and the metal member 20 are brought into contact with each other, both can be fixed by using an adhesive.

Further, the heat insulating layer (heat insulating member) 30 may only be sandwiched between the two adjacent plate-shaped metal members 20. In this case, the heat insulating layer (heat insulating member) 30 having a relatively high rebound resilience is preferably used so as to press the metal members 20 by being sandwiched between the two adjacent plate-shaped metal members 20. This leads to reduction in contact resistance (heat resistance) to further improve the cooling effect as a result of pressing the metal members 20 to the side surfaces of the battery cells 10.

Further, even in a case where the heat insulating layer 30 is only the gas layer (only a void) such as air, unless the gas layer is subjected to active convection, an effect of radiant heat in a temperature zone of about 100° C. is negligible, and thus the gas layer with a low thermal conductivity insulates heat between the plate-shaped metal members 20. For example, the heat insulating layer 30 of an air layer does not produce a large difference in a heat insulation effect from that of the glass wool. However, in the case where the heat insulating layer 30 is only the gas layer, a temperature gradient occurs around the battery cell 10, which causes natural convection of the gas to raise the possibility of also an increase in heat transfer coefficient between the plate-shaped metal members 20 due to convective heat conduction depending on the surrounding structure. Thus, for the heat insulating layer 30, the heat insulating member is more preferably used.

In the case of having the void between the heat insulating layer (heat insulating member) 30 and the metal member 20, the air layer present in such a void is responsible for the heat insulation effect between the two adjacent plate-shaped metal members 20 together with the heat insulating member 30. In this case, the heat insulating layer (heat insulating member) 30 can be fixed on the cooling structure 40 thereunder with the adhesive or the like. Further, the heat insulating member 30 may only be placed between the two adjacent plate-shaped metal members 20.

An installation position and an area of the heat insulating layer (heat insulating member) 30 is preferably set to be a position and a size in each of which at least the entire surface of the metal member 20 is covered. This is because at the time of abnormal heat generation of the battery cell 10, the restraint on heat dissipation from the side surface of the metal member 20 enables an efficient transfer of heat of the battery cell 10 from the metal member 20 to the cooling member 40. Moreover, disposing the heat insulating layer to face the entire side surface of the battery cell 10 is more preferable because the transfer of heat to the adjacent battery cells 10 can be restrained.

Figure 4:
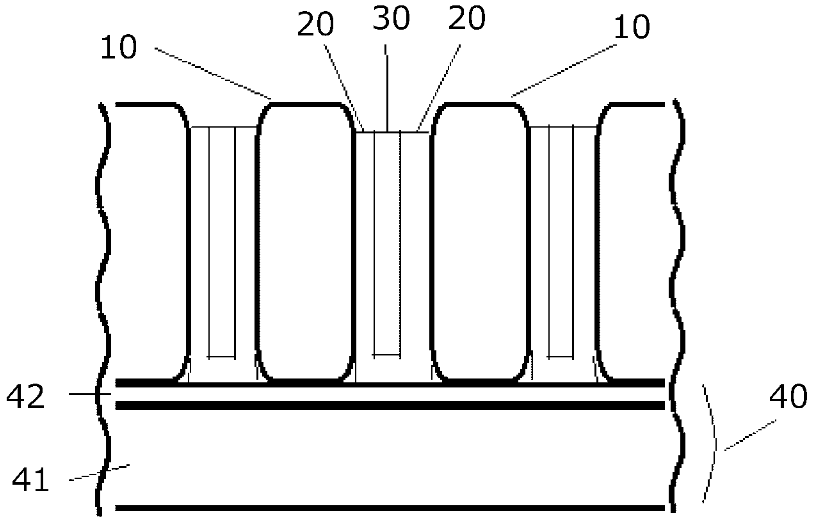
FIG. 4 is an explanatory view schematically illustrating the other example of the battery cell cooling structure (a sectional view in the battery module longitudinal direction) according to the embodiment of the present invention. (an example)

Moreover, as in FIG. 4, the lower portions of the plate-shaped metal members 20 in thermal contact with the respective side surfaces of the adjacent battery cells 10 are connected to each other to be in a recessed shape (in other words, a cross-sectional shape of the plate-shaped metal members 20 is in a recessed shape), and such metal members 20 may be inserted between the battery cells 10, thereafter further installing the heat insulating layer (heat insulating member) 30 in a recess of the plate-shaped metal members 20. In such a manner as described above, only the insertion of the metal members 20 between the adjacent battery cells 10 enables a desired heat-insulating state, which further improves productivity. In addition, the heat insulating layer (heat insulating member) 30 can be stably installed. A height of a connecting portion of the lower portions of the metal members 20 is preferably set to one quarter or less of the entire height of the metal member in terms of sufficiently holding the heat insulation effect of the heat insulating member 30.

<Regarding Multi-Layer Structure>

Figure 2:
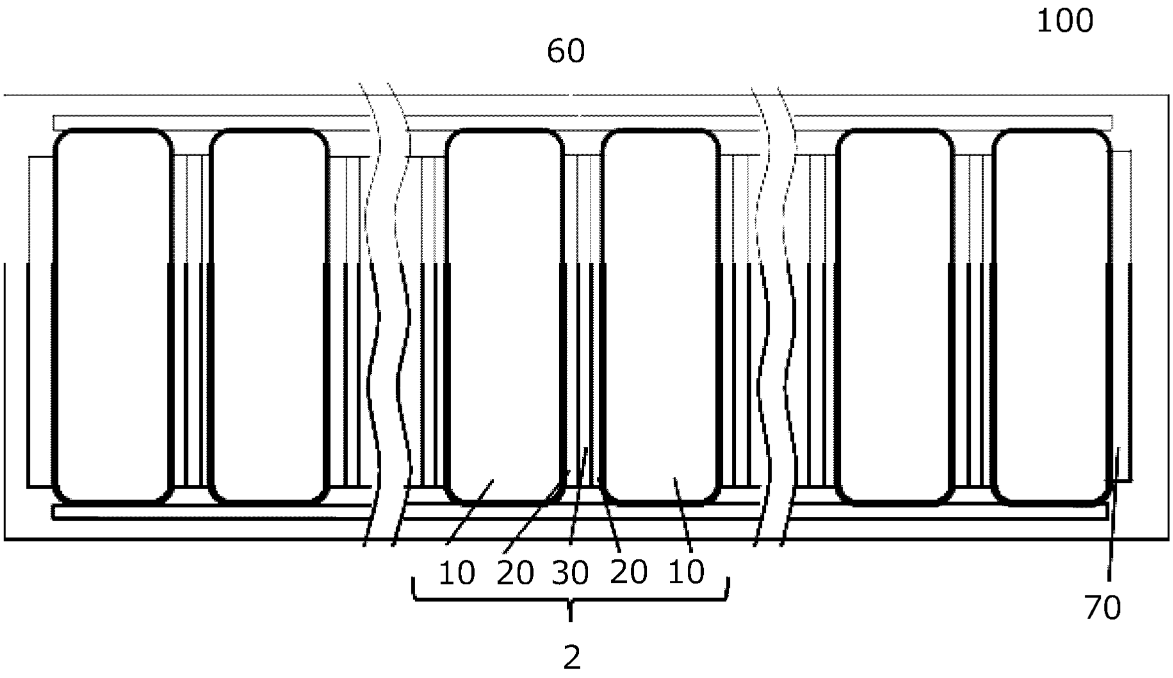
FIG. 2 is an explanatory view schematically illustrating a battery module according to the embodiment of the present invention.

In this embodiment, as exemplified in FIG. 2, between the adjacent battery cells, a multi-layer structure of the battery cell 10/the plate-shaped metal member 20/the heat insulating layer 30/the plate-shaped metal member 20/the battery cell 10 is formed. In this multi-layer structure, the characteristics of each of the plate-shaped metal member 20/the heat insulating layer 30/the plate-shaped metal member 20 are as described above. The limitation as the entire multi-layer structure is not set within the above-described ranges. For example, the above-described two plate-shaped metal members 20 present between the adjacent cells may be different in thermal conductivity and thickness between each other. However, both the same characteristics lead to an excellent balance as the entire cooling structure, and are also preferable in terms of restraint on nonuniformity of temperature and ease in production.

In a case where the two adjacent plate-shaped metal members 20 are the same in thermal conductivity and thickness, regarding a thickness ratio of the plate-shaped metal member 20/the heat insulating layer 30/the plate-shaped metal member 20, when a thickness of the plate-shaped metal member 20 is set to 1.0, a thickness of the heat insulating layer 30 is preferably set to 0.2 to 4.0, and more preferably set to 0.5 to 3.0. That is, the thickness ratio of the plate-shaped metal member 20/the heat insulating layer 30/the plate-shaped metal member 20 is preferably set to 1.0:0.2 to 4.0:1.0, and more preferably set to 1.0:0.5 to 3.0:1.0.

<Regarding Thermal Contact>

(Thermal Contact Between Side Surface of Battery Cell and Plate-Shaped Metal Member)

In this embodiment, the situation in which the side surface of the battery cell 10 and the plate-shaped metal member 20 are in thermal contact with each other also includes connection (contact) capable of conducting heat between the two with a contact member such as an adhesive, grease, or a thin sheet (not illustrated) between the two, in addition to direct contact between the two.

Even for the direct contact between the two, contact resistance at a contact interface caused by a slight difference in surface roughness and curvature between the two is present. Thus, the heat resistance from a surface of the battery cell 10 to a surface of the plate-shaped metal member 20 on the heat insulating material side is larger than heat resistance of the single plate-shaped metal member 20. A heat resistance Rs at the contact interface is, as prepared with a heat resistance Rm of the single plate-shaped metal member 20, preferably $Rs/Rm \leq 3.0$, more preferably $Rs/Rm \leq 1.5$, and much further preferably $Rs/Rm \leq 1.0$. Note that the heat resistance Rs at the contact interface is represented by $L/\lambda$, or $1/h$ [$m^2 \cdot K/W$]. Here, for the use of the contact member, the aforesaid L represents a thickness of the contact member present at the contact interface, the aforesaid $\lambda$ represents a thermal conductivity of the contact member, and the aforesaid h represents a heat transfer coefficient at the contact interface.

For the direct contact, the reduction in the heat resistance Rs at the contact interface is only required for reduction in the surface roughness (irregularities) of the side surface of the battery cell 10 and the plate-shaped metal member 20 through polishing or the like, an increase in a pressing pressure of the plate-shaped metal member 20 on the side surface of the battery cell 10, or the like.

Further, the side surface of the battery cell 10 and the plate-shaped metal member 20 can also be brought into thermal contact with each other with the adhesive or the grease therebetween. By interposing the adhesive or the grease therebetween, the irregularities on both the surfaces can be filled in to increase a substantial contact area easily, which is preferable. For use of the adhesive or the grease, one having high thermal conductivity such as a thermal conductivity of 1.0 W/m·K or more is preferably used. The thermal conductivity of the adhesive or the grease is more preferably 2.0 W/m·K or more, and further preferably 4.0 W/m·K or more. Meanwhile, the thermal conductivity of the adhesive or the grease is substantially set to about 10.0 W/m·K as an upper limit. The adhesive or the grease is preferable because application thin enough to fill in both their irregularities allows the reduction in the heat resistance. The adhesive or the grease is preferably set to be an application thickness of, for example, about 0.01 to 0.2 mm depending on a degree of the irregularities.

Further, the side surface of the battery cell 10 and the plate-shaped metal member 20 can also be brought into thermal contact with each other with the thin sheet such as a heat transfer sheet therebetween. The heat transfer sheet having a soft material such as a silicone rubber base can fill in the irregularities on both the surfaces to increase a substantial contact area easily similarly to the adhesive or the grease, which is preferable. Further, use of a heat transfer sheet having electrical insulation also allows further securing of an inter-cell electrical insulation property. The heat transfer sheet is often larger in thickness than the adhesive or the grease, and thus a thermal conductivity is preferably higher. For example, the thermal conductivity of the heat transfer sheet is preferably 2 W/m·K or more, and more preferably 10 W/m·K or more. Meanwhile, the thermal conductivity of the heat transfer sheet is substantially set to about 50 W/m·K as an upper limit.

The adhesive or the grease, or, the heat transfer sheet may be used after a ceramic filler or the like is further mixed therewith to impart improvement in heat transfer property and the electrical insulation property.

A lithium-ion secondary cell which is one of typical battery cells is known to cause expansion and contraction through charge and discharge. In this event, the grease having a similar behavior to a liquid has a possibility that a "pump-out phenomenon" in which the grease is pushed out of a gap by a repeat of such expansion and contraction occurs. To prevent such a pump-out phenomenon, an adhesive solidified after being cured (in more detail, the adhesive solidified at normal temperature) or a solid heat transfer sheet is more preferably used. In particular, the adhesive is cured to fit a shape and a gap, which allows heat to be conducted from the battery cell 10 without being affected by a thickness, a shape, distortion, surface irregularities, and the like. Between them, a soft adhesive having elasticity is particularly preferable because it is easily deformed to fit even the expansion and contraction and does not crack or break even in the repeated expansion and contraction.

A thickness of each of such an adhesive, grease, and a heat transfer sheet is preferably smaller from the viewpoint of heat conduction, and preferably larger from the viewpoint of handling the expansion and contraction. In consideration of such a tradeoff relation, the thickness of each of the adhesive, the grease, and the heat transfer sheet is preferably 1 μm or more, and more preferably 5 μm or more. Further, the thickness of each of the adhesive, the grease, and the heat transfer sheet is preferably 2 mm or less, and more preferably 500 μm or less.

Also when the side surface of the battery cell 10 and the plate-shaped metal member 20 are brought into thermal contact with each other with the contact member such as the adhesive, the grease, or the heat transfer sheet therebetween, a heat resistance Rs of the adhesive, the grease, or the heat transfer sheet is, as prepared with the heat resistance Rm of the single plate-shaped metal member 20, preferably $Rs/Rm \leq 1.5$, more preferably $Rs/Rm \leq 0.8$, and much further preferably $Rs/Rm \leq 0.5$, similarly to the direct contact. In this case, Rs/Rm can be adjusted by material selection (thermal conductivity) and thickness setting.

(Thermal Contact Between End Portion of Plate-Shaped Metal Member and Cooling Member)

In this embodiment, the situation in which one end portion of the plate-shaped metal member 20 (in FIG. 1, the rectangular plate shape forms four end portions, an end portion of which is present on the cooling member side) and the cooling member 40 are in thermal contact with each other also includes connection (contact) capable of conducting heat between the two with the adhesive or the grease, or, the thin heat transfer sheet between the two in addition to the direct contact between the two, similarly to the thermal contact between the side surface of the battery cell and the plate-shaped metal member. FIG. 1 illustrates an example using the thin sheet (the heat transfer sheet 42).

Figure 5:
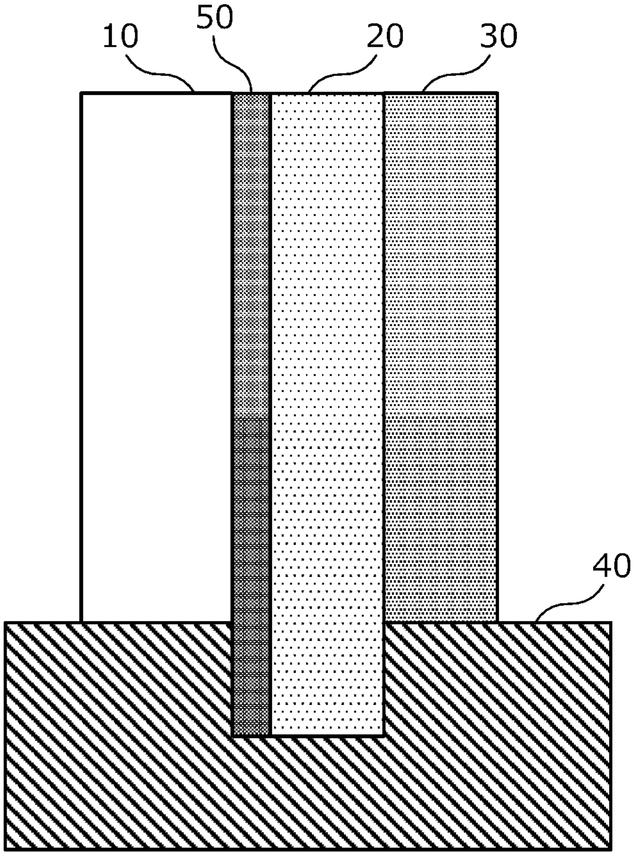
FIG. 5 is an explanatory view schematically illustrating one example of thermal contact between a metal member and a cooling member in the battery cell cooling structure according to the embodiment of the present invention.

In FIG. 1, the one end portion of the plate-shaped metal member 20 is placed directly on the heat transfer sheet 42 forming the upper surface of the cooling member 40 to be in thermal contact therewith. Here, as illustrated in FIG. 5, the plate-shaped metal member 20 may enter the interior of the cooling member 40. The structure as illustrated in FIG. 5 can be achieved by, for example, providing a groove portion in the cooling member 40, and fitting the end portion of the plate-shaped metal member 20 into the groove portion to bring them into thermal contact. Such a structure allows an increase in a contact area between the plate-shaped metal member 20 and the cooling member 40 and a reduction in a substantial heat resistance between the plate-shaped metal member 20 and the cooling member 40, which enables more reliable cooling of the abnormally heat-generating battery cell 10. In FIG. 5, by extending a heat transfer sheet 50 installed between the plate-shaped metal member 20 and the side surface of the battery cell 10 as it is together with the plate-shaped metal member 20 to fill in the groove portion of the cooling member 40 together with the plate-shaped metal member 20, the thermal contact between the cooling member 40 and the plate-shaped metal member 20 is secured.

<Regarding Cooling Characteristic>

The structure of this embodiment enables improvement in cooling capability as compared with conventional techniques. Here, cooling characteristics in the structure of this embodiment illustrated in FIG. 1 are expressed clearly in comparison with the conventional techniques illustrated in FIGS. 6 to 8.

Figure 6:
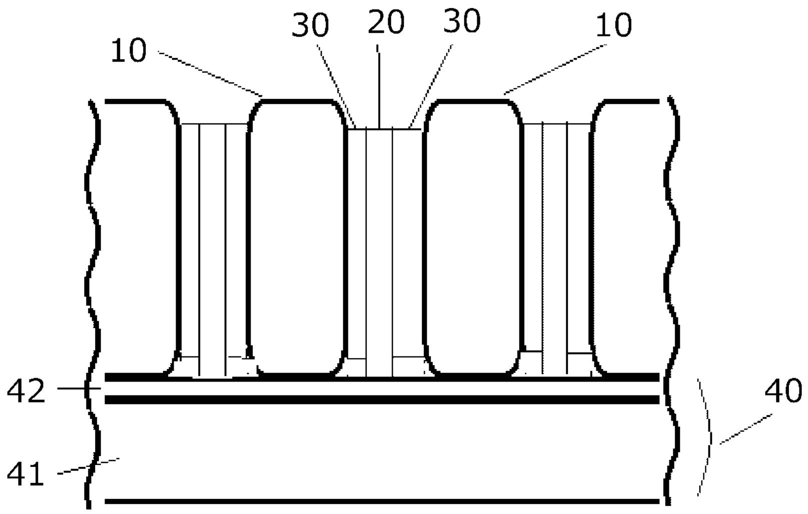
FIG. 6 is a schematic view for explaining a battery cell cooling structure of a conventional technique (a comparative example) (a sectional view in a battery module longitudinal direction).

In a cooling structure illustrated in FIG. 6, positions of the metals and the heat insulating material are replaced in the cooling structure in FIG. 1 (a thickness of a metal member is the same as the total thickness of the two metal members in FIG. 1, and the total thickness of two heat insulating members is the same as the thickness of the heat insulating layer in FIG. 1). The structure except for the above is the same as that in FIG. 1. That is, a multi-layer structure of "cell/heat insulating member/metal member/heat insulating member/cell" is included, and the cooling structure in which one end portion of the metal member is in thermal contact with a cooling member thereunder is included. Cooling structures illustrated in FIG. 7 and FIG. 8 indicate, between battery cells, a cooling structure in which only a metal member 20 is installed and a cooling structure in which only a heat insulating member 30 is installed, respectively (thicknesses of the metal member and the heat insulating member are each the same as a thickness of the multi-layer structure in FIG. 1). The structure except for the above is the same as that in FIG. 1 (in FIG. 7, the metal member is in thermal contact with a cooling member thereunder).

Figure 7:
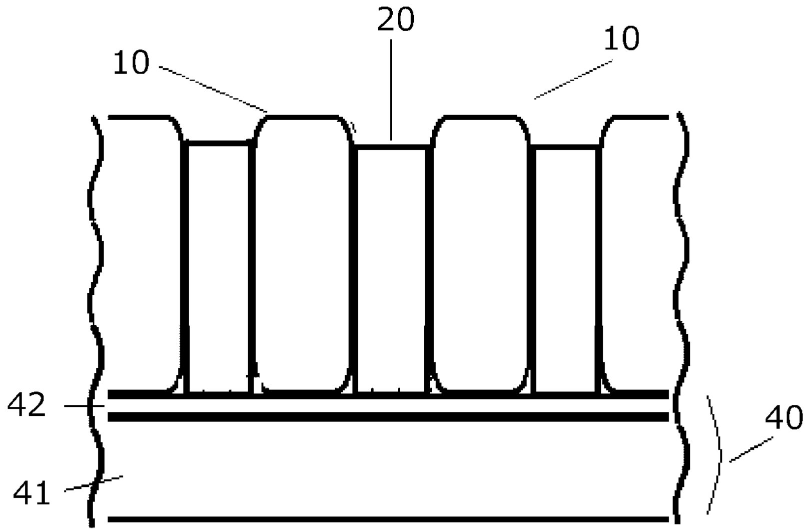
FIG. 7 is a schematic view for explaining a battery cell cooling structure in which only a metal member or a heat insulating member is installed between adjacent battery cells (a comparative example) (a sectional view in a battery module longitudinal direction).
Figure 8:
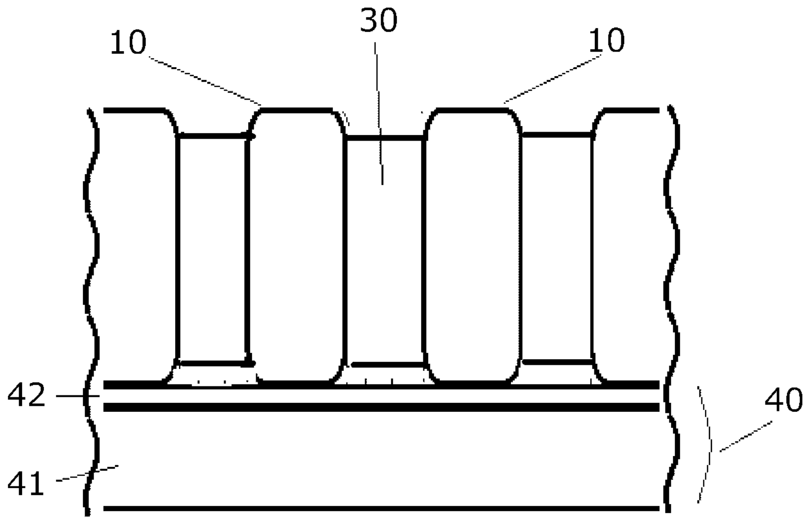
FIG. 8 is a schematic view for explaining a battery cell cooling structure in which a gap (air layer) is provided between adjacent battery cells (a comparative example) (a sectional view in a battery module longitudinal direction).
Figure 9:
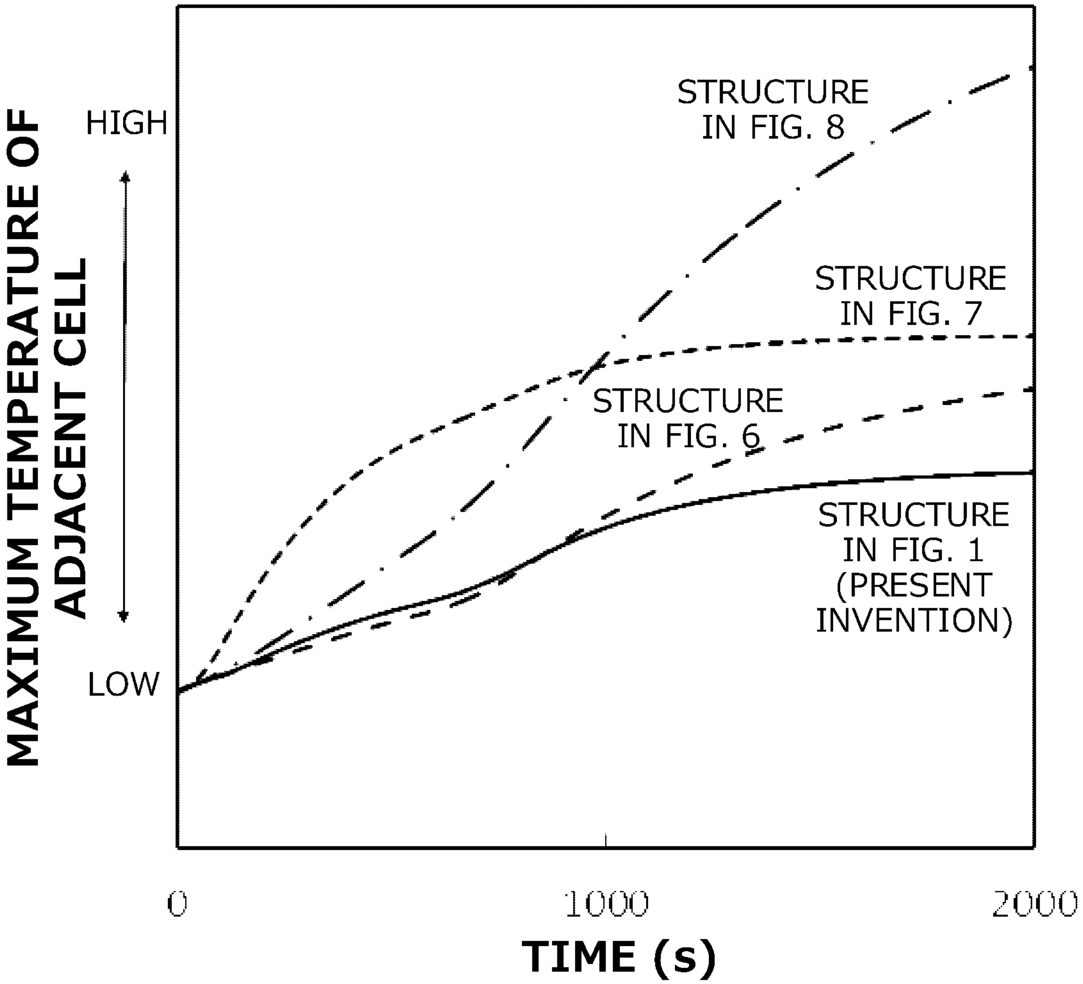
FIG. 9 is a temperature history chart in which cooling characteristics of the respective battery cell cooling structures illustrated in FIG. 1, FIG. 6 to FIG. 8, and so on are compared.

FIG. 9 is a temperature history chart schematically illustrating a difference in cooling characteristic when the cooling structures in FIG. 1 and FIG. 6 to FIG. 8 are used, and indicates a change in a temperature (in a portion considered the most heated) with time in battery cells adjacent to an abnormally heat-generating battery cell.

The cooling structure of this embodiment in FIG. 1 is found to have the lowest temperature finally to be the most excellent in the cooling capability. The cooling structure in FIG. 6 indicates a temperature change similar to that of the cooling structure in FIG. 1 until the middle thereof, but the temperature starts to deviate toward a higher one from about 1000 seconds to become higher in temperature than the cooling structure in FIG. 1. In the cooling structure in FIG. 7 in which only the metal member is installed, the temperature initially rises the earliest, but the temperature rise is slowed in the middle thereof to become a low temperature next to FIG. 1 and FIG. 6. In the cooling structure in FIG. 8 in which only a heat insulating member is installed, a temperature rise is initially slower than that in the cooling structure in which only the metal member is installed in FIG. 7, but is reversed near 1000 seconds, finally resulting in the highest temperature. Note that in the cooling structure in FIG. 8, a case of setting the heat insulating member as only an air layer also has been found to result in a temperature change substantially similar to the case of only the heat insulating member.

As in the above, the cooling capability of the cooling structure in FIG. 1 has been found to make the result unable to be predicted easily from the cooling capability of the cooling structures in FIG. 6 to FIG. 8.

Such superiority in the cooling capability of the cooling structure according to the present invention is exhibited in a case of using the plate-shaped metal member having the thermal conductivity of 100 W/m·K or more and the thickness of 0.3 mm or more and the heat insulating layer having the thermal conductivity of 1.0 W/m·K or less and the thickness of 0.5 mm or more. A deviation from such ranges does not cause the superiority, and depending on circumstances, it also has been found that in the structure in FIG. 7 in which only the metal member is present, such a phenomenon that a maximum temperature is low as a result is seen.

<Regarding Manufacturing Method for Cooling Structure>

A manufacturing method of this embodiment is not particularly limited. The thermal contact of the plate-shaped metal members 20 with the side surfaces of the adjacent battery cells 10, the thermal contact of at least one end portion of the plate-shaped metal member 20 with the cooling member 40, the installation of the heat insulating layer 30 between the adjacent plate-shaped metal members 20, and the like only need to be appropriately carried out.

<Regarding Evaluation Method for Thermal Conductivity>

(Evaluation Method for Thermal Conductivity of Plate-Shaped Metal Member)

In the thermal conductivity of the plate-shaped metal member 20, clarifying a material quality of the plate-shaped metal member 20 allows specifying of the thermal conductivity as a physical property value characterizing the material quality.

When the material quality of the plate-shaped metal member 20 is not clarified, or when the physical property value of the thermal conductivity is not well known even though the material quality is clarified, a measurement is carried out by a Straight Fin Temperature Fitting (SFTF) method. A measurement method for the thermal conductivity of the plate-shaped metal member 20 will be briefly described while referring to FIG. 10 and FIG. 11.

Here, when the plate-shaped metal member 20 is already disposed on the surface of the battery cell 10, the plate-shaped metal member 20 is removed from the surface of the battery cell 10, thereafter measuring the thermal conductivity. Further, when the plate-shaped metal member 20 is disposed on the surface of the battery cell 10 with the heat transfer sheet therebetween, the plate-shaped metal member 20 is removed from the heat transfer sheet, thereafter measuring the thermal conductivity.

Concretely, when the plate-shaped metal member 20 is in contact with the battery cell 10 with the grease therebetween, the plate-shaped metal member 20 is peeled off in a direction perpendicular to the battery cell 10 to wipe up the grease, thereby allowing use for the measurement. Further, when the plate-shaped metal member 20 is bonded to the battery cell 10 with the adhesive, the plate-shaped metal member 20 is peeled off the battery cell by using a tool such as a scraper, and the surface on which the adhesive is present is polished, thereby exposing the surface of the plate-shaped metal member 20 to smooth the surface. When the plate-shaped metal member 20 is also in contact with the heat transfer sheet, the plate-shaped metal member is similarly peeled off to be used for the measurement.

Thereafter, the surface, of the plate-shaped metal member 20, closest to the surface of the battery cell 10 is set as a measured surface, and the entire region except for this measured surface and a portion to which heat flow is input is covered with a heat insulating material. This allows obtaining of a specimen of the plate-shaped metal member 20 used for the SFTF method.

Figure 10:
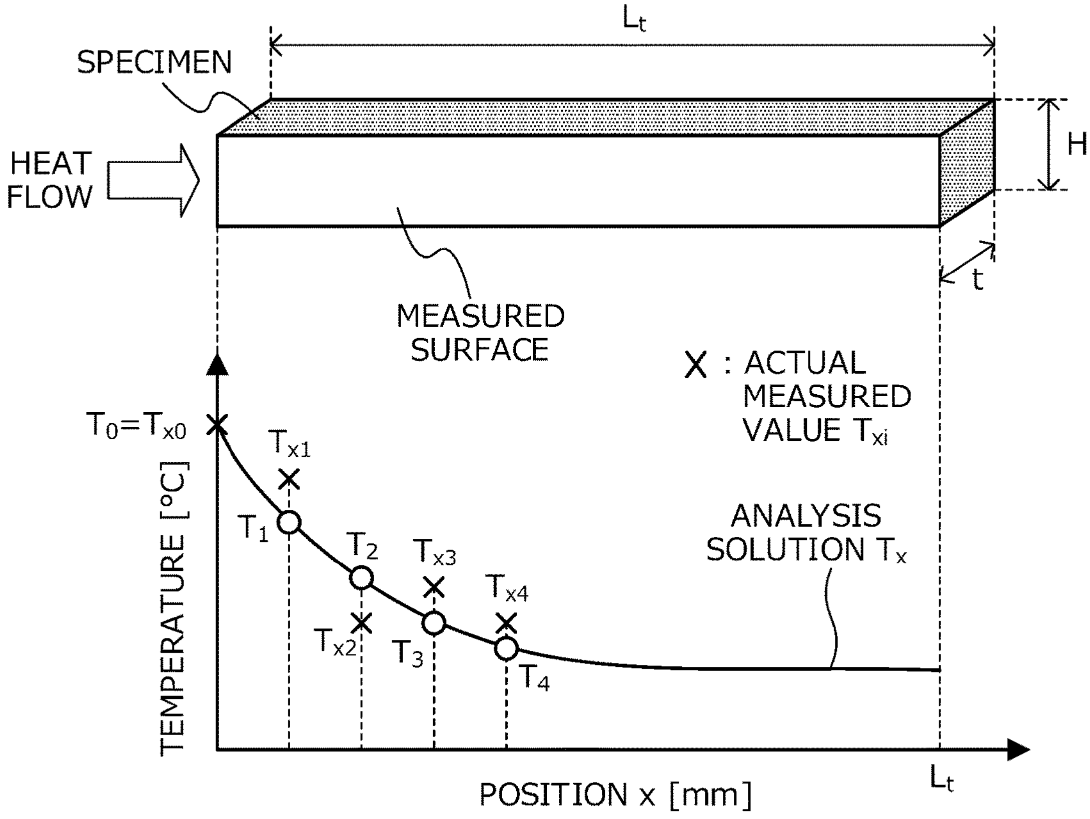
FIG. 10 is an explanatory chart for explaining a measurement method for a thermal conductivity of a metal member.

FIG. 10 is an explanatory chart for explaining a principle of the SFTF method. One end portion of a flat-plate specimen having a length Lt [m], a cross-sectional area A [$m^2$]=H×t, a circumferential length P [m]=2×(Lt+H+t) as illustrated in the upper tier in FIG. 10 is heated, and regarding the specimen at the steady time in cooling the other end portion, a boundary temperature in the portion to which the heat flow is input $T_0=T_{X0}$, and a temperature rise distribution from ambient air of the specimen $T_i$ (i=1 to n: temperature measurement point number) are measured.

Meanwhile, a temperature distribution analysis formula of straight fins which provides an analysis solution $T_{Xi}$ regarding a temperature distribution of the straight fins is provided by a following formula (101) by using a boundary condition of one-end temperature fixing and one-end-face heat insulating of the specimen. Thus, by comparing the obtained measured values $T_{Xi}$ and an analysis solution $T_X$ of a temperature rise in straight fin provided by the formula (101), a standard deviation σ defined by a following formula (103) is calculated, and a parameter in in the analysis formula is determined to minimize this standard deviation.

Further, when an in-plane direction thermal conductivity of the focused sample (a thermal conductivity in the length Lt direction in FIG. 10) is represented as $k_p$, the parameter in in the analysis formula represented by the formula (101) is represented as in a following formula (105) by using an average heat transfer coefficient $h_m$ from a surface of the specimen to ambient air.

Further, the average heat transfer coefficient $h_m$ is represented as in following formula (107) to formula (111) by using theoretical formulas of a vertical plate natural convection heat transfer coefficient and a radiative heat transfer coefficient. Here, in the following formula (107) to formula (111), $h_{nm}$ is a natural convection heat transfer coefficient with respect to a vertical plate with a height H, and $h_{rm}$ is a radiative heat transfer coefficient, from a surface, of an emissivity ε. Further, $k_a$, $v_a$, β, Pr are a thermal conductivity of air, a kinematic viscosity coefficient, an expansion coefficient, a Prandtl number, respectively. Further, g is a gravitational acceleration, and σ' is a Stefan-Boltzmann constant (=$5.67\times10^{-8}$ W/$m^2$·$K^4$). $T_m$, $T_a$ are an average temperature and an outside air temperature of the specimen represented by the absolute temperature, respectively. ΔTm is an average temperature rise of the specimen, and can be found by $\Delta T_0\cdot\phi$ by using a fin efficiency ϕ (0.8) and a temperature rise $\Delta T_0$ in x=0.

[Numerical formula 1]

$$T_x = T_0\frac{\cosh m(L_t - x)}{\cosh mL_t} \quad \text{formula (101)}$$

$$\sigma = \sqrt{\frac{\sum_i (T_i - T_{xi})^2}{n-1}} \quad \text{formula (103)}$$

-continued $$m = \sqrt{\frac{h_m P}{k_p A}} \quad \text{formula (105)}$$

$$h_m = h_{nm} + h_{rm} \quad \text{formula (107)}$$

$$h_{nm} = 0.56 \cdot \left(\frac{k_a}{H}\right) \cdot \left(\frac{g\beta H^3 \Delta T_m}{v_a^2} \cdot Pr\right)^{1/4} \quad \text{formula (109)}$$

$$h_{rm} = \varepsilon\sigma'\left(T_m^3 + T_m^2 T_a + T_m T_a^2 + T_a^3\right) \quad \text{formula (111)}$$

Figure 11:
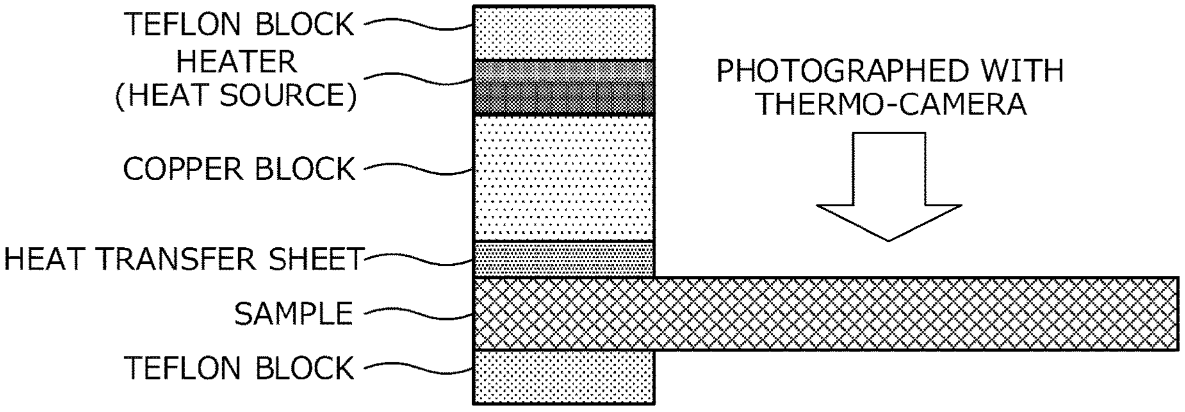
FIG. 11 is an explanatory diagram for explaining the measurement method for the thermal conductivity of the metal member.

In measuring a thermal conductivity of an actual metal member, a target metal member is cut out in a size of 20 mm in width×200 mm in length, thereafter forming such a stacked structure as illustrated in FIG. 11, a heater is installed at one side, and a heater output is set to 1.6 W at 10 V. Thereafter, an in-plane temperature distribution of the metal member is photographed with a thermo-camera, the obtained thermal image is converted to the temperature distribution, and a relation between a test length and a surface temperature is confirmed. Analyzing the obtained relation between the test length and the surface temperature by the above-described Straight Fin Temperature Fitting method allows obtaining of the thermal conductivity of the focused metal member. Note that when the size of the metal member is too small to be cut out in the size of 20 mm in width×200 mm in length, such a smaller specimen as 20 mm in width×100 mm in length allows the measurement.

Further, in the structure in which the heat transfer sheet is present between the battery cell and the plate-shaped metal member, a measurement method for a thermal conductivity of this heat transfer sheet can be carried out similarly to the above-described measurement method for the thermal conductivity of the plate-shaped metal member.

(Evaluation Method for Thermal Conductivity of Adhesive and Grease)

The thermal conductivities of the adhesive and the grease can be measured by a heat resistance measurement method in conformity with ASTM 5470 as follows.

Figure 12:
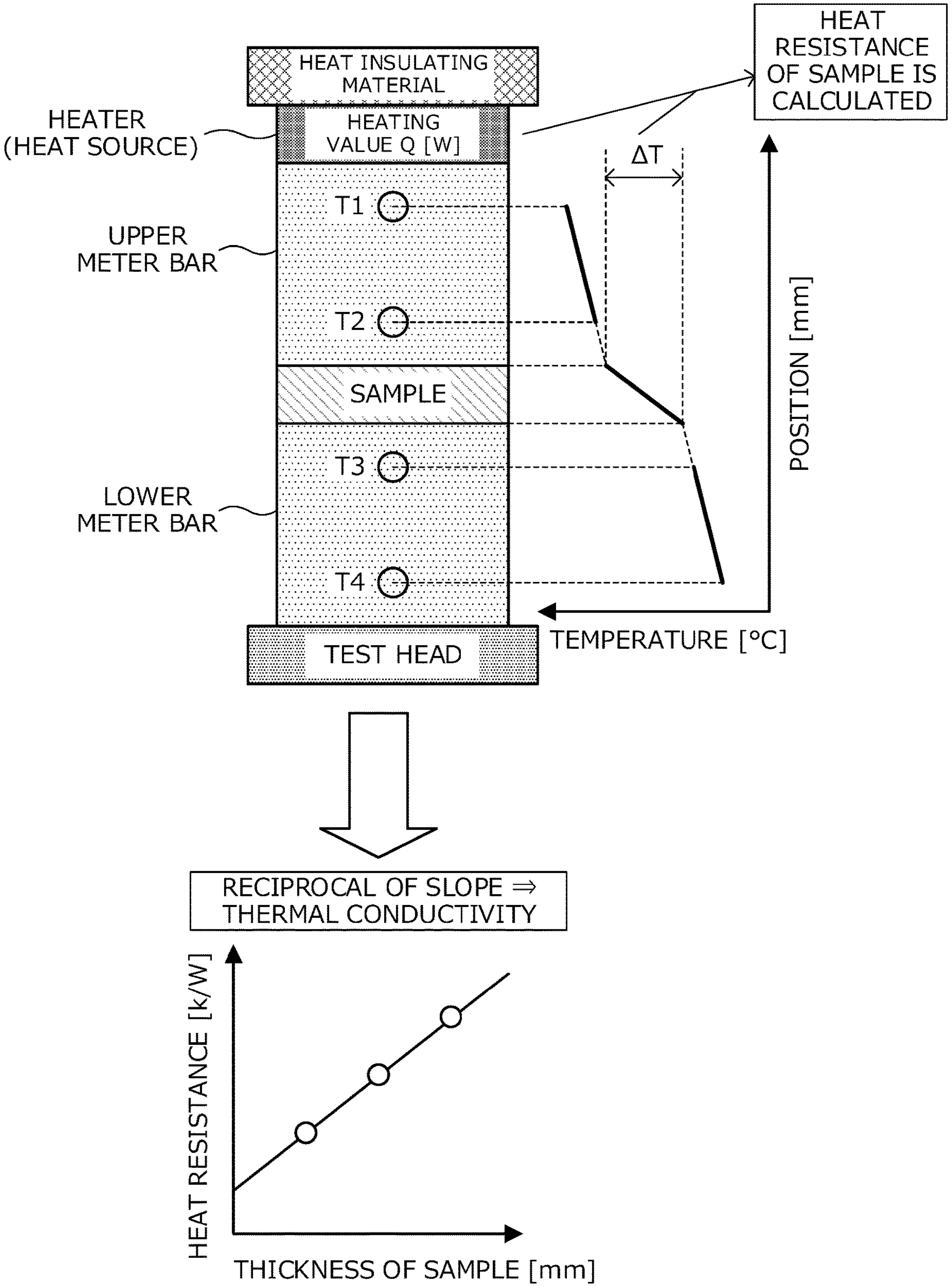
FIG. 12 is explanatory charts for explaining a measurement method for thermal conductivities of an adhesive and grease.

As illustrated in a figure on the left side in FIG. 12, the focused sample is sandwiched between an upper meter bar and a lower meter bar, and electric power is applied to the heater on the upper meter bar side. On the other hand, a test head on the lower meter bar side is held at a constant temperature by a method such as water cooling. On the basis of the above, a heat resistance of the sample is found from a relation between positions and temperatures in the upper meter bar and the lower meter bar. Concretely, thermocouples are attached at the positions illustrated by T1 to T4 in the figure, and a surface temperature of the sample on the upper meter bar side is calculated based on a temperature gradient calculated from the temperatures obtained at T1 to T2, and a surface temperature of the sample on the lower meter bar side is calculated based on a temperature gradient calculated from the temperatures obtained at T3 to T4. On the basis of this, a temperature difference ΔT inside the sample is calculated. Further, by using a heating value Q [W] from the heater, the heat resistance of the sample can be found.

While varying a thickness of the sample, the heat resistance of the sample is calculated in such a manner as described above, and the obtained results are plotted on a plane of coordinates defined by the thickness and the heat resistance of the sample as illustrated in the lower tier in FIG. 12. Thereafter, the obtained distribution of plots is approximated to a straight line by a least square method, thereby calculating a slope of the straight line. A reciprocal of the obtained slope is the thermal conductivity of the focused sample.

The measurement method for the thermal conductivity as described above allows variations in applied pressure on the upper meter bar side differently from a transistor method or a model heater method, which enables the heat resistance to the applied pressure to be evaluated in a manner to be well reproduced. In an actual measurement, thin films of 0.5 mm, 1.0 mm, 1.5 mm in thickness are produced to be each cut into 20 mm square. Thereafter, each of the cut samples only needs to be sandwiched between the meter bars to be measured. At this time, a material of the meter bar is set as SUS304 (20 mm square), and a load in the measurement is set to 3 kg/cm$^2$. On the basis of the above, by calculating a slope from a relation between the heat resistance and the thickness, the thermal conductivity only needs to be calculated from a reciprocal of the slope.

Further, in a case of obtaining only a small amount of the focused adhesive and grease, the focused adhesive and grease are dissolved in a proper organic solvent, and insoluble filler particles are extracted. The extracted filler particles are used for a component analysis by fluorescent X-rays and a crystal structure analysis by X-ray diffraction, thereby identifying a kind of filler particle. Further, regarding composition of a matrix resin, the obtained resin solution is observed by infrared spectroscopy, thereby identifying a kind of matrix resin. Further, from amounts of the extracted filler and matrix, the thermal conductivity can be calculated by a following formula (121).

Here, in the following formula (121), $\lambda_{matrix}$ is a thermal conductivity of the matrix resin, $\lambda_{filter}$ is a thermal conductivity of the filler particle, and $\lambda_{composite}$ is a thermal conductivity of the composite. Further, $\phi$ is a filler content (volume fraction), and x is a form factor of the filler (in a case of a perfect sphere, x=2 is minimum.).

[Numeral formula 2]

$$1 - \phi = \frac{\lambda_{composit} - \lambda_{filler}}{\lambda_{matrix} - \lambda_{filler}} \cdot \left[\frac{\lambda_{matrix}}{\lambda_{composit}}\right]^{\frac{1}{1+x}} \quad \text{formula (121)}$$

<Regarding Evaluation Method for Heat Resistance>

The heat resistance (Rm) of the plate-shaped metal member can be found by Rm=Lm/λm from the thermal conductivity (λm) of the plate-shaped metal member found by the above-described evaluation method and the thickness (Lm) of the plate-shaped metal member.

Further, the heat resistance (Rs) of the adhesive, the grease, or the heat transfer sheet can be found by Rs=Ls/λs from the thermal conductivity (λs) of the adhesive, the grease, or the heat transfer sheet found by the above-described evaluation method and the thickness (Ls) of the adhesive, the grease, or the heat transfer sheet.

Rm and Rs are found by such an evaluation method, thereby allowing the calculation of the above-described Rs/Rm.

<Regarding Battery Module, Battery Pack>

Any battery module and any battery pack may be used long as they have the cooling structure between the battery cells in the above-described embodiment of the present invention. The battery pack may be not only a plurality of battery packs formed in parallel in a horizontal direction or a vertical direction but also a single battery module.

Example

Hereinafter, while presenting examples and comparative examples, a cooling structure between battery cells, and, a battery cell module having the cooling structure, and, a battery pack according to the present invention will be described while citing concrete examples. Note that examples presented below are each absolutely only an example of the present invention, and the present invention is not limited to the following examples.

[Battery Cell and Battery Module]

For the battery cell, a square-shaped cell (27 mm in length×170 mm in width×115 mm in height) whose casing was made of copper was used, and the eight cells were disposed linearly to face each other to produce the battery module. Four kinds of the battery modules whose inter-cell gaps were set to 0.5 mm, 2 mm, 3 mm, and 5 mm were prepared.

[Charge/Discharge Test Equipment]

For a charge/discharge test on the produced battery modules, EVT60V120A manufactured by NIPPON STEEL TEXENG. CO., LTD. was used.

[Cooling Device]

For a cooling device functioning as a thermal cooling mechanism, a self-produced water cooler (190 mm in length×400 mm in width×40 mm in height) was used, the battery module was placed thereon, and the battery was charged and discharged. A battery cell cooling mechanism achieved in this manner has a structure as exemplified roughly in the cross-sectional view (the cross section in a longitudinal direction of the battery module) in FIG. 1.

[Metal Member and Heat Insulating Layer]

As a plate-shaped metal member, an aluminum plate having a thermal conductivity of 235 W/m·K at normal temperature was used. In examples of the present invention, the aluminum plate, to which silicone grease manufactured by Shin-Etsu Chemical Co., Ltd. (G-777, a thermal conductivity of 3.3 W/(m·K) at normal temperature), an adhesive manufactured by CEMEDINE CO., LTD. (SX1008, a thermal conductivity of 1.7 W/(m·K) at normal temperature, abbreviated as an “adhesive 1” in following Table 1.), or an adhesive manufactured by CEMEDINE CO., LTD. (RH96L, a thermal conductivity of 2.1 W/(m·K) at normal temperature, abbreviated as an “adhesive 2” in following Table 1.) was applied thin (about 0.02 mm in thickness), was stuck on the cell. At this time, in the square-shaped cell which is a rectangular parallelepiped, the aluminum plate was stuck on the substantially entire surface of a side surface of the cell which is a to-be-stuck surface (excluding several mm of an upper end portion and several mm of each of right and left end portions. An area ratio of 95% or more.). Further, the stuck aluminum plate was connected to the water cooler installed under the battery module with the silicone grease manufactured by Shin-Etsu Chemical Co., Ltd. (G-777, the thermal conductivity of 3.3 W/(m·K) at normal temperature) therebetween (an application of about 0.1 mm) A ratio of a heat resistance of the metal member to the heat resistance Rs of the grease or the adhesive (Rs/Rm) is presented in following Table 1.

As a heat insulating member in a heat insulating layer, glass wool having a thermal conductivity of 0.05 W/m·K at normal temperature, or refractory cloth manufactured by NICHIAS Corporation (TOMBO No. 8300, a thermal conductivity of 0.10 W/m·K at normal temperature) adjusted to a desired thickness was used.

[Regarding Multi-Layer Structure]

As a structure between the adjacent cells, as the examples of the present invention, a multi-layer structure of cell/aluminum plate/glass wool/aluminum plate/cell was set. As comparative examples (conventional techniques), a multi-layer structure of cell/glass wool/aluminum plate/glass wool/cell, a structure having the single aluminum plate, and a structure having the single glass wool were set. Following Table 1 presents the thicknesses of the members of each of the structures.

Further, also regarding a cooling structure as exemplified roughly in the cross-sectional view in FIG. 4 and a cooling structure, in which the surfaces on the short side of cells were brought into contact with the aluminum plate, as illustrated in FIG. 2, cooling capability was measured. Following Table 1 also presents conditions for the above. Note that the example of setting a gap between the cells to 0.5 mm was, needless to measure the cooling capability, obvious to be poorly evaluated, and thus the evaluation was not made below.

Cooling Performance Evaluation (Temperature Evaluation at Appearance of Abnormally Heat-Generating Cell)

A thermocouple was stuck on any position on a cell surface by using a Kapton tape, and a temperature rise with charge and discharge was measured. Combinations in the examples of the present invention and the comparative examples (conventional techniques) presented in Table 1 were evaluated. When with the above-described module in which the eight cells were linked, the two cells in the middle thereof generated heat with a constant heating value of 500 kW/h under an environment of 25° C. (simulation of abnormal heat generation), of temperatures (which were measured at three points at regular intervals in a height direction of the cell: the positions of 20 mm, 50 mm, 80 mm from the top) of the adjacent cell at 2000 seconds after the start of heating, the temperature of the most heated point was set. As a result, the one having a lower temperature than that in any of the comparative examples after 2000 seconds was set as the example of the present invention. Further, regardless of the multi-layer structure of cell/aluminum plate/glass wool/aluminum plate/cell, ones each having a small thickness of the aluminum plate and causing a higher temperature than those in the comparative examples were set as reference examples.

Note that a result of studies made by the present inventors has clarified that characteristics begin to change about after the passage of 1000 to 2000 seconds after the start of measurement, and behavior in such a range is important for performance evaluation. Further, it also has become clear that the characteristics are saturated when 2000 seconds are exceeded after the start of measurement, and the performance of the battery cell is determined. In addition, assuming that the battery cells are mounted on an electric vehicle, when the battery cell is becoming a dangerous state, the time during which a passenger retreats is required to be secured, which requires a decision as early as possible. In line with such a point, as described above, a decision at 2000 seconds after the start of measurement has been made.

Further, Comparative example 1 was used as a reference in a cell spacing of 5 mm, Comparative example 4 was used as a reference in a cell spacing of 3 mm, and Comparative example 6 was used as a reference in a cell spacing of 2 mm, and cooling performance was compared between the examples of the present invention, the reference examples, and the comparative examples in the respective cell spacings. The comparison was indicated as battery cell temperature reduction percentages in below-represented formulas by the comparison at a maximum temperature of the cell after 2000 seconds.

Battery cell temperature reduction percentage (%) (case of example of the present invention)=[(maximum temperature of the cell in reference comparative example−maximum temperature of the cell in example of the present invention)/maximum temperature of the cell in reference comparative example]×100

Battery cell temperature reduction percentage (%) (case of reference example)=[(maximum temperature of the cell in reference comparative example−maximum temperature of the cell in reference example)/maximum temperature of the cell in reference comparative example]×100

Battery cell temperature reduction percentage (%) (case of comparative example)=[(maximum temperature of the cell in reference comparative example−maximum temperature of the cell in comparative example)/maximum temperature of the cell in reference comparative example]×100

Further, the above-described temperature reduction percentages were evaluated as an evaluation point "A" for 10% or more, an evaluation point "B" for 5% or more and less than 10%, an evaluation point "C" for more than 0% and less than 5%, and an evaluation point "D" for 0% or less. Note that one exhibiting more excellent performance as compared with the multi-layer structure of cell/glass wool/aluminum plate/glass wool/cell (that is, the above-described B structure) is regarded as "acceptance".

TABLE 1

| | COOLING STRUCTURE BETWEEN BATTERY CELLS | CELL SPACING (mm) | KIND OF METAL MEMBER | KIND OF HEAT INSULATING LAYER | THICKNESS OF METAL MEMBER (mm) | THICKNESS OF HEAT INSULATING LAYER (mm) |
|---|---|---|---|---|---|---|
| COMPARATIVE EXAMPLE 1 | CELL/HEAT INSULATING MEMBER/METAL MEMBER/HEAT INSULATING MEMBER/CELL | 5.0 | ALUMINUM | GLASS WOOL | 3.0 | 1.0 × 2 |
| COMPARATIVE EXAMPLE 2 | CELL/METAL MEMBER/CELL | 5.0 | ALUMINUM | — | 5.0 | — |
| EXAMPLE OF PRESENT INVENTION 1 | CELL/METAL MEMBER/HEAT INSULATING MEMBER/METAL MEMBER/CELL | 5.0 | ALUMINUM | GLASS WOOL | 1.5 × 2 | 2 |
| EXAMPLE OF PRESENT INVENTION 2 | CELL/METAL MEMBER/HEAT INSULATING MEMBER/METAL MEMBER/CELL | 5.0 | ALUMINUM | GLASS WOOL | 2.25 × 2 | 0.5 |
| EXAMPLE OF PRESENT INVENTION 3 | CELL/METAL MEMBER/HEAT INSULATING MEMBER/METAL MEMBER/CELL | 5.0 | ALUMINUM | GLASS WOOL | 2.0 × 2 | 1 |
| EXAMPLE OF PRESENT INVENTION 4 | CELL/METAL MEMBER/HEAT INSULATING MEMBER/METAL MEMBER/CELL | 5.0 | ALUMINUM | GLASS WOOL | 1.0 × 2 | 3 |
| REFERENCE EXAMPLE 1 | CELL/METAL MEMBER/HEAT INSULATING MEMBER/METAL MEMBER/CELL | 5.0 | ALUMINUM | GLASS WOOL | 0.25 × 2 | 4.5 |
| COMPARATIVE EXAMPLE 3 | CELL/HEAT INSULATING MEMBER/METAL MEMBER/HEAT INSULATING MEMBER/CELL | 3.0 | ALUMINUM | GLASS WOOL | 1.0 | 1.0 × 2 |
| COMPARATIVE EXAMPLE 4 | CELL/HEAT INSULATING MEMBER/METAL MEMBER/HEAT INSULATING MEMBER/CELL | 3.0 | ALUMINUM | GLASS WOOL | 0.5 | 0.5 × 2 |
| COMPARATIVE EXAMPLE 5 | CELL/METAL MEMBER/CELL | 3.0 | ALUMINUM | — | 3.0 | — |
| EXAMPLE OF PRESENT INVENTION 5 | CELL/METAL MEMBER/HEAT INSULATING MEMBER/METAL MEMBER/CELL | 3.0 | ALUMINUM | GLASS WOOL | 0.5 × 2 | 2 |

TABLE 1-continued

| | | | | | | |
|---|---|---|---|---|---|---|
| EXAMPLE OF PRESENT INVENTION 6 | CELL/METAL MEMBER/HEAT INSULATING MEMBER/METAL MEMBER/CELL | 3.0 | ALUMINUM | GLASS WOOL | 1.0 × 2 | 1 |
| COMPARATIVE EXAMPLE 6 | CELL/HEAT INSULATING MEMBER/METAL MEMBER/HEAT INSULATING MEMBER/CELL | 2.0 | ALUMINUM | GLASS WOOL | 1.0 | 0.5 × 2 |
| COMPARATIVE EXAMPLE 7 | CELL/METAL MEMBER/CELL | 2.0 | ALUMINUM | — | 2.0 | — |
| EXAMPLE OF PRESENT INVENTION 7 | CELL/METAL MEMBER/HEAT INSULATING MEMBER/METAL MEMBER/CELL | 2.0 | ALUMINUM | GLASS WOOL | 0.5 × 2 | 1 |
| EXAMPLE OF PRESENT INVENTION 8 | CELL/METAL MEMBER/HEAT INSULATING MEMBER/METAL MEMBER/CELL (CONNECTION OF LOWER PORTIONS OF METAL MEMBERS) | 5.0 | ALUMINUM | GLASS WOOL | 1.5 × 2 | 2 |
| EXAMPLE OF PRESENT INVENTION 9 | CELL/METAL MEMBER/HEAT INSULATING MEMBER/METAL MEMBER/CELL (METAL MEMBER ALSO ON SIDE SURFACE ON SHORT SIDE) | 5.0 | ALUMINUM | GLASS WOOL | 1.5 × 2 | 2 |
| EXAMPLE OF PRESENT INVENTION 10 | CELL/METAL MEMBER/HEAT INSULATING MEMBER/METAL MEMBER/CELL | 5.0 | DURALUMIN | GLASS WOOL | 1.5 × 2 | 2 |
| COMPARATIVE EXAMPLE 8 | CELL/HEAT INSULATING MEMBER/METAL MEMBER/HEAT INSULATING MEMBER/CELL | 5.0 | DURALUMIN | GLASS WOOL | 3.0 | 1.0 × 2 |
| REFERENCE EXAMPLE 2 | CELL/METAL MEMBER/HEAT INSULATING MEMBER/METAL MEMBER/CELL | 5.0 | CAST IRON | GLASS WOOL | 1.5 × 2 | 2 |
| COMPARATIVE EXAMPLE 9 | CELL/HEAT INSULATING MEMBER/METAL MEMBER/HEAT INSULATING MEMBER/CELL | 5.0 | CAST IRON | GLASS WOOL | 3.0 | 1.0 × 2 |
| EXAMPLE OF PRESENT INVENTION 11 | CELL/METAL MEMBER/HEAT INSULATING MEMBER/METAL MEMBER/CELL | 5.0 | ALUMINUM | GLASS PLATE | 1.5 × 2 | 2 |
| COMPARATIVE EXAMPLE 10 | CELL/HEAT INSULATING MEMBER/METAL MEMBER/HEAT INSULATING MEMBER/CELL | 5.0 | ALUMINUM | GLASS PLATE | 3.0 | 1.0 × 2 |
| EXAMPLE OF PRESENT INVENTION 12 | CELL/METAL MEMBER/HEAT INSULATING MEMBER/METAL MEMBER/CELL | 5.0 | ALUMINUM | GLASS WOOL | 1.5 × 2 | 2 |

TABLE 1-continued

| | | | | | | |
|---|---|---|---|---|---|---|
| EXAMPLE OF PRESENT INVENTION 13 | CELL/METAL MEMBER/HEAT INSULATING MEMBER/METAL MEMBER/CELL | 5.0 | ALUMINUM | GLASS WOOL | 1.5 × 2 | 2 |
| EXAMPLE OF PRESENT INVENTION 14 | CELL/METAL MEMBER/HEAT INSULATING MEMBER/METAL MEMBER/CELL | 5.0 | ALUMINUM | REFRACTORY CLOTH | 2.0 × 2 | 1 |

| | | | HEAT RESISTANCE RATIO | COOLING PERFORMANCE EVALUATION | | |
|---|---|---|---|---|---|---|
| | REMARKS | INTERFACE BETWEEN CELL AND METAL MEMBER | BETWEEN GREASE/ ADHESIVE AND METAL MEMBER Rs/Rm | BATTERY TEMPERATURE REDUCTION PERCENTAGE AFTER 2000 SECOND (%) | REFERENCE | EVALU-ATION |
| COMPARATIVE EXAMPLE 1 | REFERENCE IN 5 mm BETWEEN CELLS | — | — | 0 | COMPARATIVE EXAMPLE 1 | — |
| COMPARATIVE EXAMPLE 2 | | — | 0.3 | −12 | COMPARATIVE EXAMPLE 1 | D |
| EXAMPLE OF PRESENT INVENTION 1 | | GREASE | 1.0 | 18 | COMPARATIVE EXAMPLE 1 | A |
| EXAMPLE OF PRESENT INVENTION 2 | | GREASE | 0.6 | 12 | COMPARATIVE EXAMPLE 1 | A |
| EXAMPLE OF PRESENT INVENTION 3 | | GREASE | 0.7 | 18 | COMPARATIVE EXAMPLE 1 | A |
| EXAMPLE OF PRESENT INVENTION 4 | | GREASE | 1.5 | 10 | COMPARATIVE EXAMPLE 1 | B |
| REFERENCE EXAMPLE 1 | | GREASE | 5.8 | −26 | COMPARATIVE EXAMPLE 1 | D |
| COMPARATIVE EXAMPLE 3 | | — | — | −8 | COMPARATIVE EXAMPLE 4 | D |
| COMPARATIVE EXAMPLE 4 | REFERENCE IN 3 mm BETWEEN CELLS | — | — | 0 | COMPARATIVE EXAMPLE 4 | — |
| COMPARATIVE EXAMPLE 5 | | GREASE | 0.5 | −3 | COMPARATIVE EXAMPLE 4 | D |
| EXAMPLE OF PRESENT INVENTION 5 | | GREASE | 2.9 | 6 | COMPARATIVE EXAMPLE 4 | B |
| EXAMPLE OF PRESENT INVENTION 6 | | GREASE | 1.5 | 16 | COMPARATIVE EXAMPLE 4 | A |
| COMPARATIVE EXAMPLE 6 | REFERENCE IN 2 mm BETWEEN CELLS | — | — | 0 | COMPARATIVE EXAMPLE 6 | — |
| COMPARATIVE EXAMPLE 7 | | GREASE | 0.7 | 3 | COMPARATIVE EXAMPLE 6 | C |
| EXAMPLE OF PRESENT INVENTION 7 | | GREASE | 2.9 | 11 | COMPARATIVE EXAMPLE 6 | A |
| EXAMPLE OF PRESENT INVENTION 8 | CONNECTION OF ADJACENT METAL MEMBERS IN LOWER PORTION OF 25% | GREASE | 1.0 | 16 | COMPARATIVE EXAMPLE 1 | A |

TABLE 1-continued

| | | | | | | |
|---|---|---|---|---|---|---|
| EXAMPLE OF PRESENT INVENTION 9 | SIDE SURFACE ON SHORT SIDE OF CELL IS COVERED WITH 3 mm ALUMINUM PLATE | GREASE | 1.0 | 28 | COMPARATIVE EXAMPLE 1 | A |
| EXAMPLE OF PRESENT INVENTION 10 | | GREASE | 0.4 | 23 | COMPARATIVE EXAMPLE 8 | A |
| COMPARATIVE EXAMPLE 8 | REFERENCE IN 5 mm BETWEEN CELLS AND DURALUMIN AS METAL | — | — | 0 | COMPARATIVE EXAMPLE 8 | — |
| REFERENCE EXAMPLE 2 | | GREASE | 0.2 | — (MORE THAN 200° C.) | COMPARATIVE EXAMPLE 9 | — |
| COMPARATIVE EXAMPLE 9 | REFERENCE IN 5 mm BETWEEN CELLS AND CAST IRON AS METAL | — | — | — (MORE THAN 200° C.) | COMPARATIVE EXAMPLE 9 | — |
| EXAMPLE OF PRESENT INVENTION 11 | | GREASE | 1.0 | 7 | COMPARATIVE EXAMPLE 10 | B |
| COMPARATIVE EXAMPLE 10 | REFERENCE IN 5 mm BETWEEN CELLS AND GLASS PLATE AS HEAT INSULATING MATERIAL | — | — | 0 | COMPARATIVE EXAMPLE 10 | — |
| EXAMPLE OF PRESENT INVENTION 12 | | ADHESIVE 1 | 1.9 | 17 | COMPARATIVE EXAMPLE 1 | A |
| EXAMPLE OF PRESENT INVENTION 13 | | ADHESIVE 2 | 1.5 | 16 | COMPARATIVE EXAMPLE 1 | A |
| EXAMPLE OF PRESENT INVENTION 14 | | GREASE | 0.7 | 12 | COMPARATIVE EXAMPLE 1 | A |

[Comparison Result of Cooling Performance]

Figure 13:
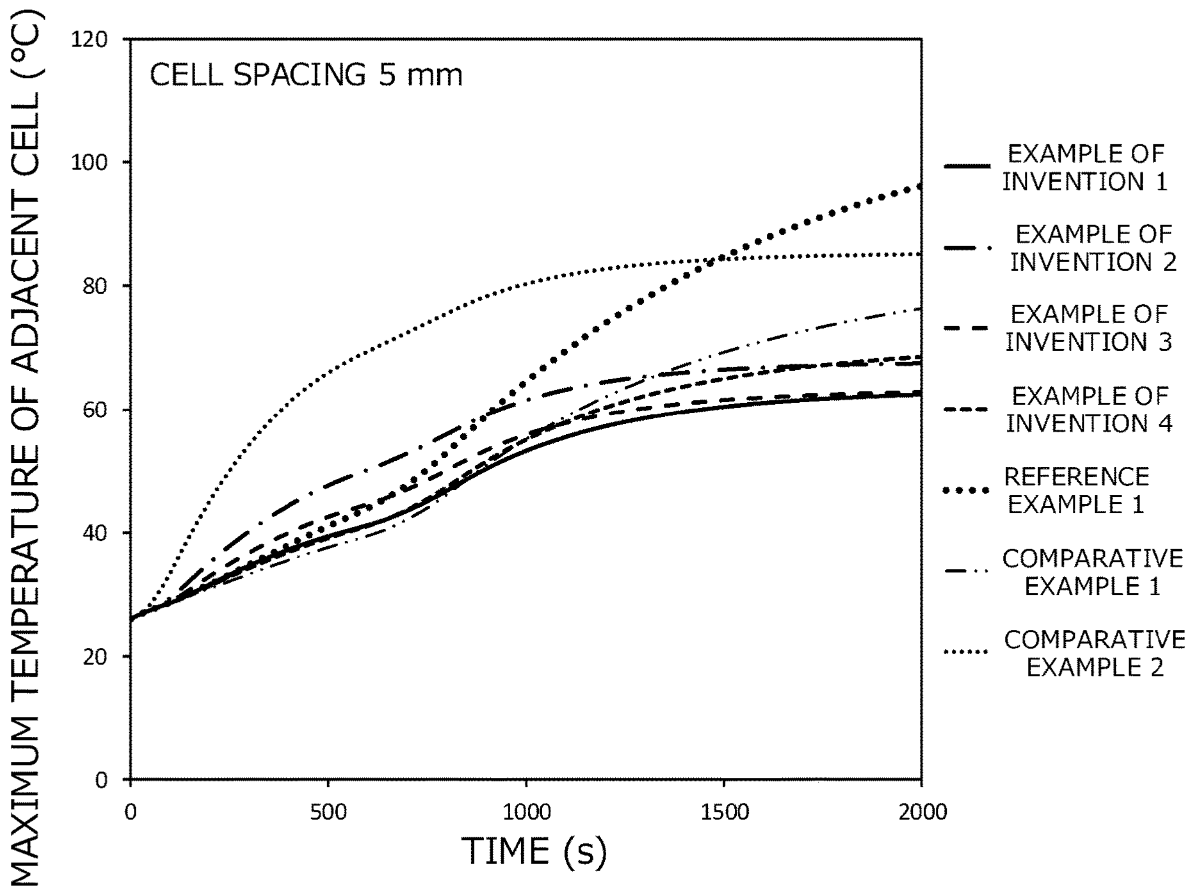
FIG. 13 is a chart illustrating results of cooling characteristics in examples of the present invention and comparative examples in examples (cell spacing 5 mm).

FIG. 13 illustrates results for 5.0 mm between the cells. With respect to Comparative example 1 [heat insulating member 1.0 mm/Al 3.0 mm/heat insulating member 1.0 mm] and Comparative example 2 [only Al 5.0 mm], in all of Example of the present invention 1 [Al 1.5 mm/heat insulating member 2.0 mm/Al 1.5 mm], Example of the present invention 2 [Al 2.25 mm/heat insulating member 0.5 mm/Al 2.25 mm], Example of the present invention 3 [Al 2.0 mm/heat insulating member 1.0 mm/Al 2.0 mm], and Example of the present invention 4 [Al 1.0 mm/heat insulating member 3.0 mm/Al 1.0 mm] which are the examples of the present invention, temperatures of the adjacent cells after 2000 seconds are lower than those in the comparative examples. The examples of the present invention are found to be higher in cooling performance than the conventional techniques. Further, Reference example 1 [Al 0.25 mm/heat insulating member 4.5 mm/Al 0.25 mm] having a small thickness of the aluminum plate was higher in a temperature of the adjacent cells after 2000 seconds than Comparative example 1, and lower in cooling performance than the conventional techniques. Further, Example of the present invention 12 and Example of the present invention 13 in each of which the cells and the metal member were bonded with the adhesive in place of the grease and Example of the present invention 14 in which refractory cloth was used for the heat insulating member in place of the glass wool were also higher in cooling performance than the conventional techniques though not illustrated in FIG. 13.

Figure 14:
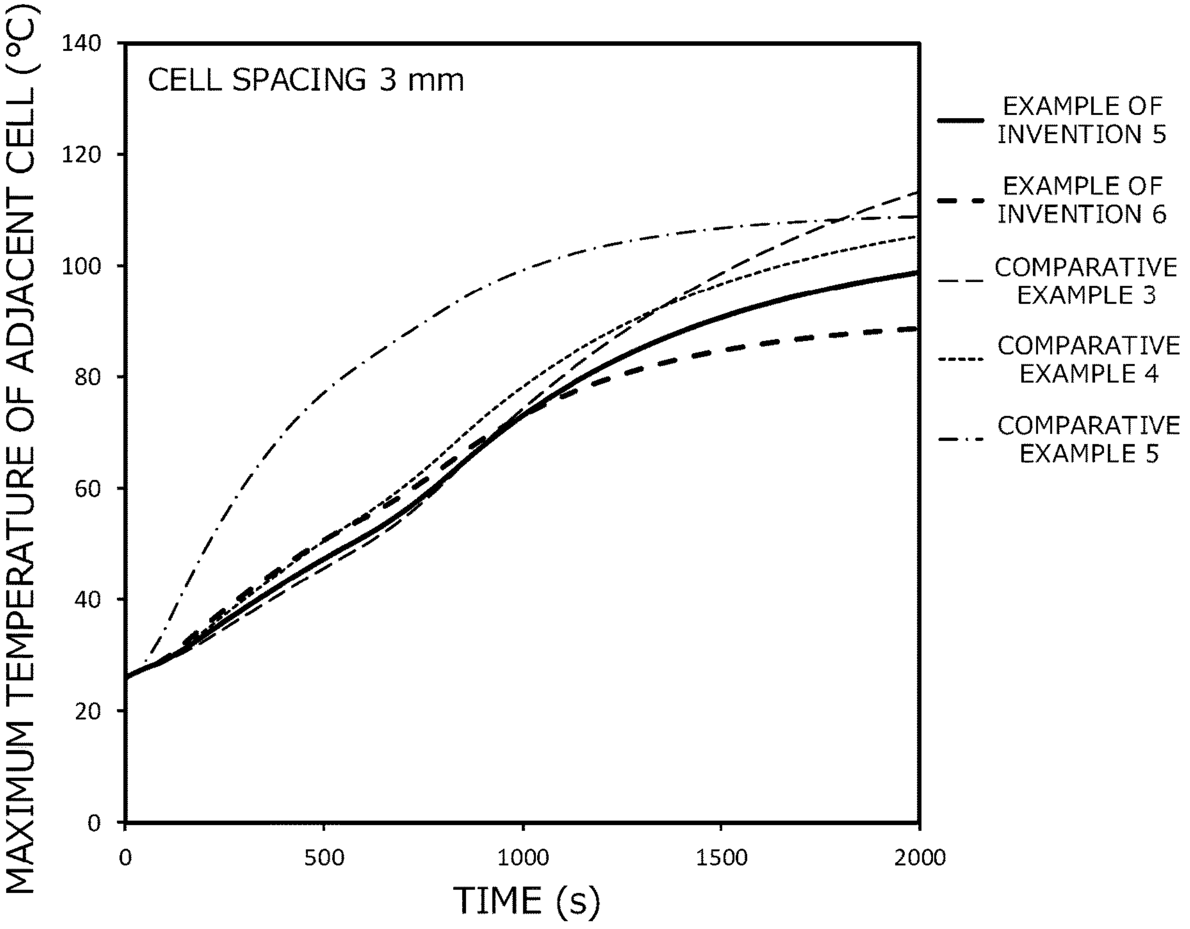
FIG. 14 is a chart illustrating results of cooling characteristics in examples of present invention and comparative examples in examples (cell spacing 3 mm).

FIG. 14 illustrates results for 3 mm between the cells. With respect to Comparative example 3 [heat insulating member 1.0 mm/Al 1.0 mm/heat insulating member 1.0 mm], Comparative example 4 [heat insulating member 0.5 mm/Al 2.0 mm/heat insulating member 0.5 mm], and Comparative example 5 [only Al 3.0 mm], either of Example of the present invention 5 [Al 0.5 mm/heat insulating member 2.0 mm/Al 0.5 mm] and Example of the present invention 6 [Al 1.0 mm/heat insulating member 1.0 mm/Al 1.0 mm] which are the examples of the present invention is found to be lower in a temperature of adjacent cells after 2000 seconds than any of the comparative examples, and to be higher in cooling performance than the conventional techniques.

Figure 15:
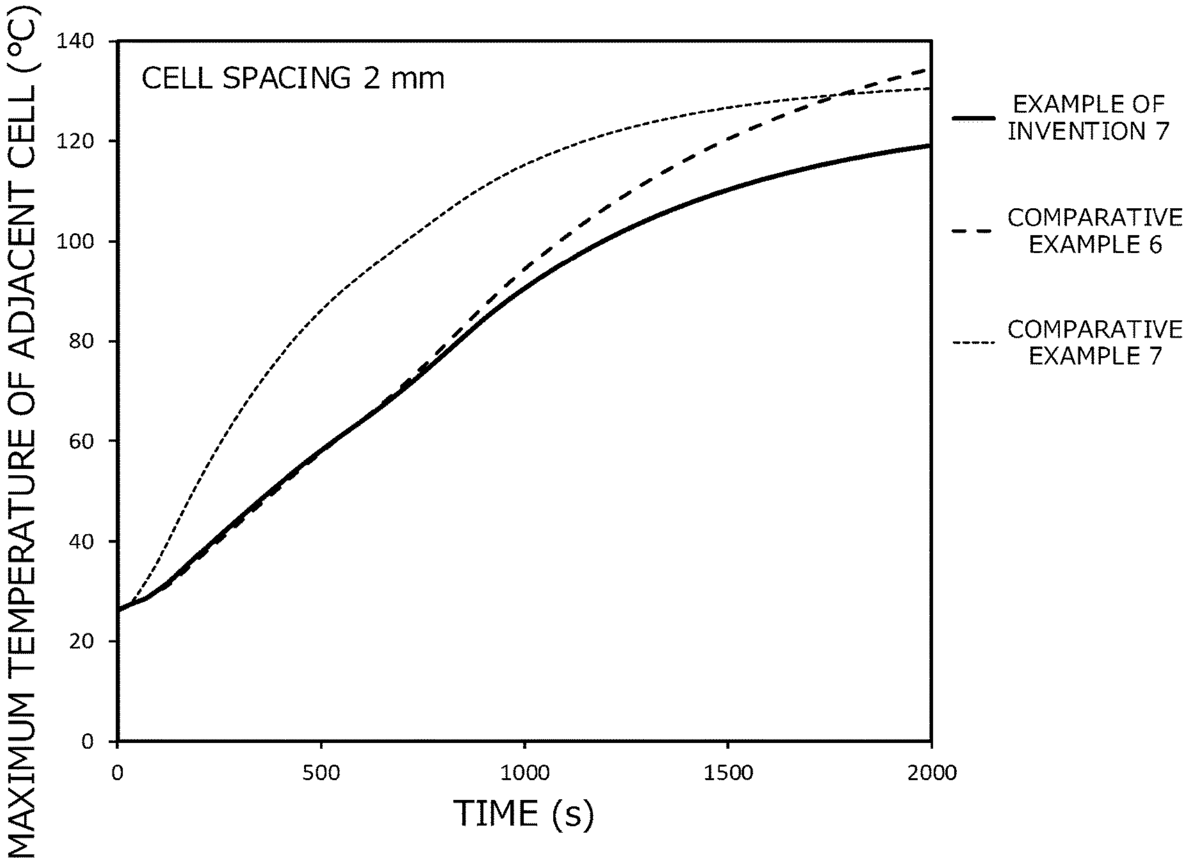
FIG. 15 is a chart illustrating results of cooling characteristics in an example of the present invention and comparative examples in examples (cell spacing 2 mm).

FIG. 15 illustrates results for 2 mm between the cells. With respect to Comparative example 6 [heat insulating member 0.5 mm/Al 1.0 mm/heat insulating member 0.5 mm] and Comparative example 7 [only Al 2.0 mm], Example of the present invention 7 [Al 0.5 mm/heat insulating member 1.0 mm/Al 0.5 mm] which is the example of the present invention is found to be lower in a temperature of adjacent cells after 2000 seconds than either of the comparative examples, and to be higher in cooling performance than the conventional techniques.

Figure 16:
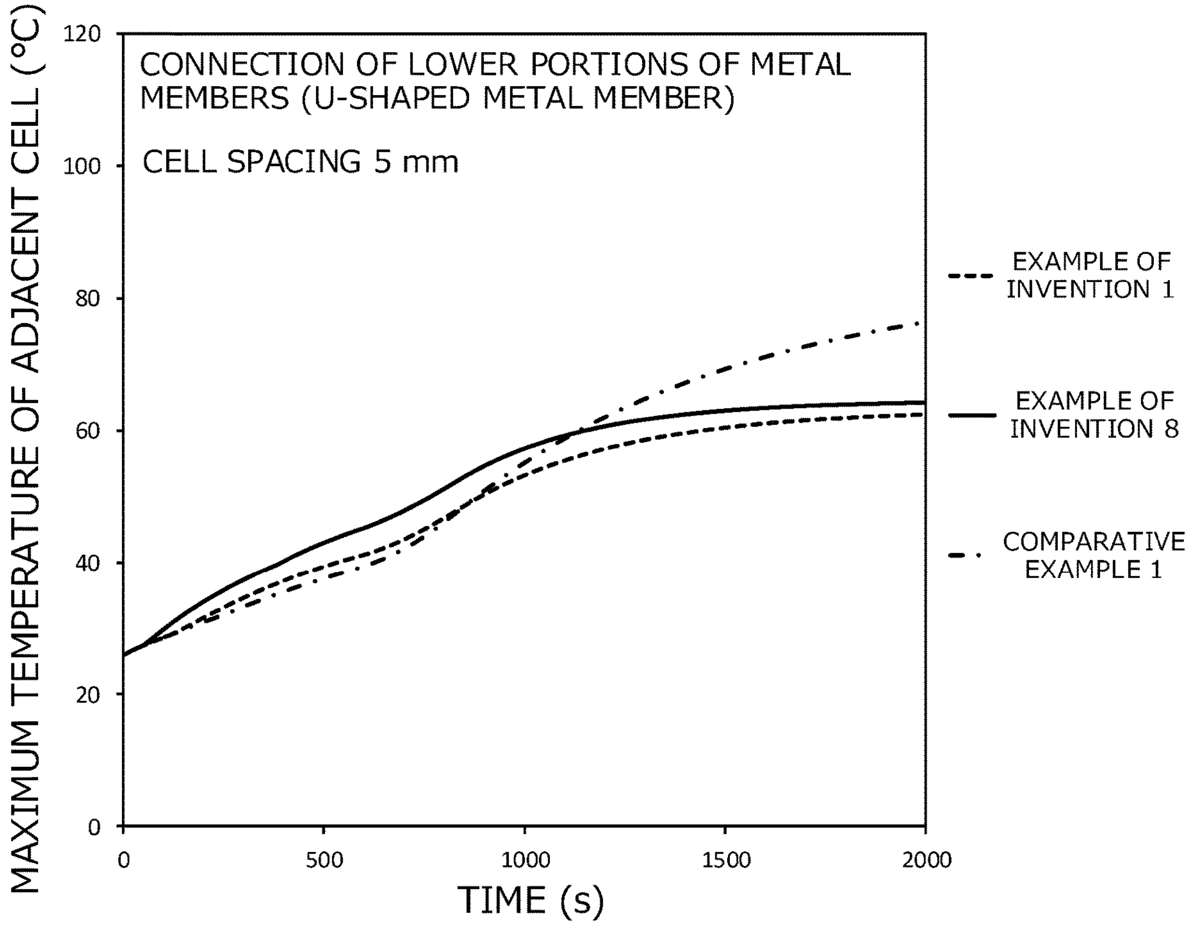
FIG. 16 is a chart illustrating results of cooling characteristics in examples of the present invention and a comparative example in examples (cell spacing 5 mm, a metal member in a U-shape).

FIG. 16 illustrates a result of Example of the present invention 8 in a case of connecting lower portions of the metal members (U-shaped metal member) (the structure in FIG. 4) ([Al 1.5 mm/heat insulating member 2.0 mm/Al 1.5 mm], in which the lower portions of the two aluminum plates are connected in regions of 25% in a height direction to be integrated.) in contrast with Example 1 and Comparative example 1, in the cell spacing of 5 mm Example of the present invention 8 is found to be slightly higher than Example 1 but lower than Comparative example 1 in a temperature of adjacent cells after 2000 seconds, and to be higher in cooling performance than the conventional techniques.

Figure 17:
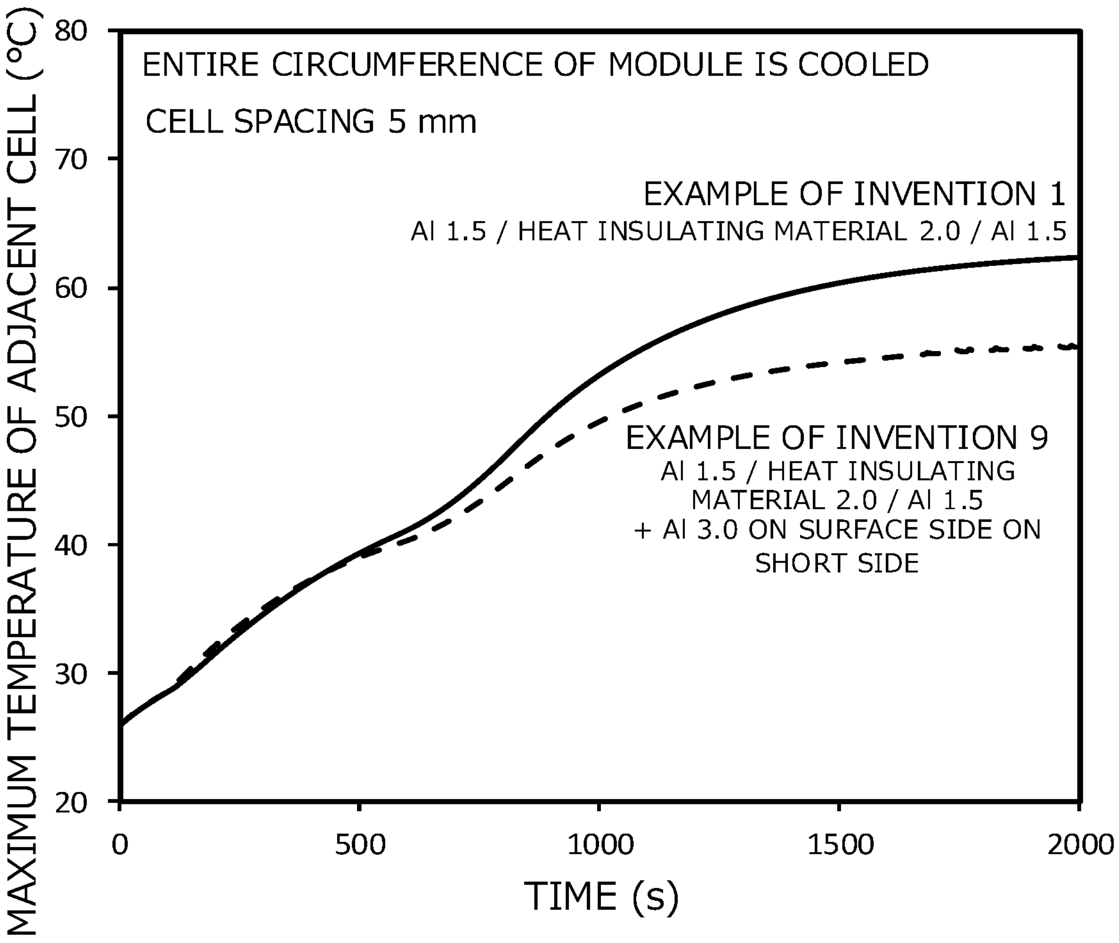
FIG. 17 is a chart illustrating results of cooling characteristics in an example of the present invention and a comparative example in examples (cell spacing 5 mm, a metal member also on side surfaces on cell short sides).

FIG. 17 illustrates Example of the present invention 9 in a case of bonding an aluminum plate (3 mm in thickness) also on the side surfaces on all the short sides of the eight battery cells with the grease therebetween to cover the entire side surface of the battery module with the aluminum plate (the structure in FIG. 2) ([Al 1.5 mm/heat insulating member 2.0 mm/Al 1.5 mm]+Al was provided on the side surfaces on the short sides.) in contrast with Example of the present invention 1. Example of the present invention 9 is found to be lower in a temperature of adjacent cells after 2000 seconds and further to be higher in cooling performance than Example of the present invention 1.

As obvious from the above-described Table 1, and FIG. 13 to FIG. 17, any of the ones corresponding to the examples of the present invention is evaluated as the evaluation point "A" or "B", and found to be more excellent in cooling performance than the conventional techniques.

[Regarding Effect of Kind of Plate-Shaped Metal Member (Thermal Conductivity)]

Figure 18:
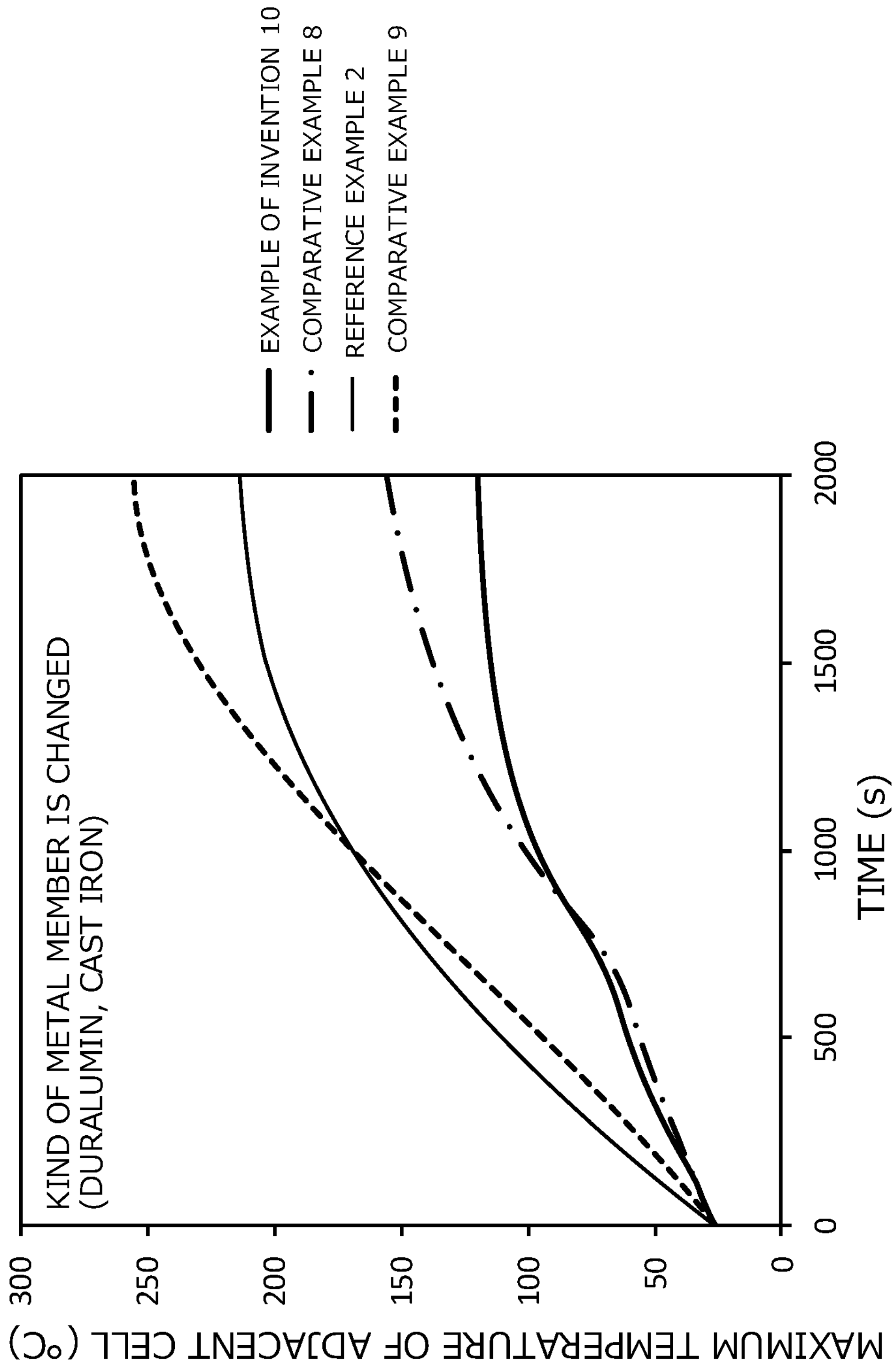
FIG. 18 is a chart illustrating results of cooling characteristics in an example of the present invention and comparative examples in examples (use of duralumin or cast iron for a metal member).

FIG. 18 illustrates results of a case of changing the metal member to duralumin (thermal conductivity: 110 W/m·K at normal temperature) and cast iron (thermal conductivity: 50 W/m·K at normal temperature).

Example of the present invention 10 is in the same condition as Example 1 except that the metal member is set as the duralumin, and Comparative example 8 is in the same condition as Comparative example 1 except that the metal member is set as the duralumin. In comparison between the two, Example of the present invention 10 is found to be lower in a temperature of adjacent cells after 2000 seconds and to be higher in cooling performance than the conventional techniques, as compared with Comparative example 8. However, it is found that in comparison with Example of the present invention 1, Example of the present invention 10 indicates an overall rise in temperature, and a thermal conductivity of the metal member is preferably 150 W/m·K or more.

Further, Reference example 2 is in the same condition as Example 1 except that the metal member is set as the cast iron, and Comparative example 9 is in the same condition as Comparative example 1 except that the metal member is set as the cast iron. In comparison between the two, Reference example 2 is lower in a temperature of adjacent cells after 2000 seconds as compared with Comparative example 9, but indicates that a maximum temperature of the adjacent cells is more than 200° C. Thus, a temperature rise of the adjacent battery cells is not said to be restrained efficiently, which regards Reference example 2 as a reference example.

[Regarding Effect of Kind of Heat Insulating Member in Heat Insulating Layer (Thermal Conductivity)]

Figure 19:
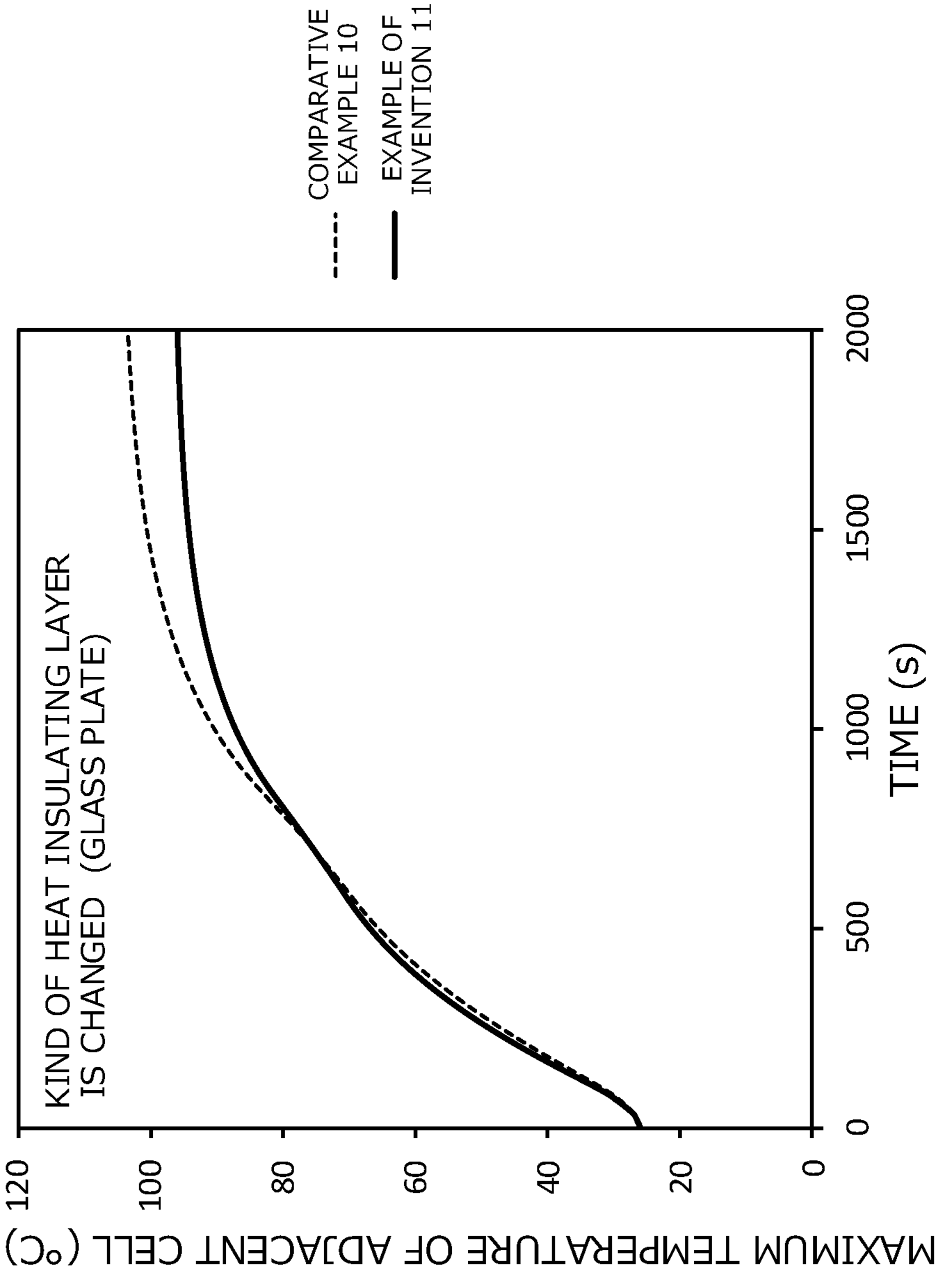
FIG. 19 is a chart illustrating results of cooling characteristics in an example of the present invention and a comparative example in examples (use of a glass plate for a heat insulating layer).

FIG. 19 illustrates results of a case of changing the heat insulating member of the heat insulating layer to a glass plate (thermal conductivity: 0.9 W/m·K at normal temperature).

Example of the present invention 11 is in the same condition as Example 1 except that the heat insulating member is set as the glass plate, and Comparative example 10 is in the same condition as Comparative example 1 except that the heat insulating member is set as the glass plate. In comparison between the two, Example of the present invention 11 is found to be lower in a temperature of adjacent cells after 2000 seconds and to be higher in cooling performance than the conventional techniques, as compared with Comparative example 10. However, it is found that in comparison with Example of the present invention 1, Example of the present invention 10 indicates an overall rise in temperature, and a thermal conductivity of the heat insulating member is preferably 0.1 W/m·K or less.

The preferred embodiments of the present invention have been described in detail above with reference to the attached drawings, but the present invention is not limited to such examples. It is apparent that a person having common knowledge in the technical field to which the present invention belongs is able to devise various variation or modification examples within the range of technical ideas described in the claims, and it should be understood that such examples belong to the technical scope of the present invention as a matter of course.

EXPLANATION OF CODES

1 cooling structure of battery cell
2 multi-layer structure
10 battery cell
20 plate-shaped metal member
30 heat insulating layer (heat insulating member or gas layer)
40 cooling member
41 cooling plate
42 heat transfer sheet
50 heat transfer sheet
60 second plate-shaped metal member
70 third plate-shaped metal member
100 battery module

What is claimed is:

1. A multi-layer structure comprising two square-shaped battery cells disposed side by side so that side surfaces of each of the two battery cells face each other, and a cooling structure between the battery cells, wherein the cooling structure between the battery cells comprises:

two plate-shaped metal members each having a thermal conductivity of 100 W/m·K or more and a thickness of 0.3 mm or more, and each being in thermal contact with a respective facing side surface of each of the battery cells, and a heat insulating layer disposed between the two plate-shaped metal members in thermal contact with the respective facing side surface of each of the battery cells, and having at least either a heat insulating member or a gas layer having a thermal conductivity of 1.0 W/m·K or less and a thickness of 0.5 mm or more, wherein a structural arrangement of the multi-layer structure is: battery cell/plate-shaped metal member/heat insulating layer/plate-shaped metal member/battery cell, the cooling structure further comprising a cooling member being in thermal contact with the battery cells, or being present in a vicinity of the battery cells, wherein:

at least one end portion of each of the plate-shaped metal members is in thermal contact with the cooling member; and the two plate-shaped metal members have a similar thermal conductivity and thickness, and a thickness ratio of plate-shaped metal member/heat insulating layer/plate-shaped metal member is 1.0:0.2 to 4.0:1.0, wherein the plate-shaped metal members are in a substantially recessed shape by connecting lower portions of the plate-shaped metal members in thermal contact with respective side surfaces of heat insulating members adjacent to each other;

the plate-shaped metal members in the substantially recessed shape are inserted between the adjacent heat insulating members; and a battery cell is disposed in the recess in the substantially recessed shape.

2. The multi-layer structure according to claim 1, wherein a side surface of each of the battery cells comprises an iron and steel material, a heat resistance at a contact interface between a battery cell among the two battery cells and a respective plate-shaped metal member is defined as Rs, and a heat resistance of the respective plate-shaped metal member is defined as Rm, and $Rs/Rm \leq 3.0$.

3. The multi-layer structure according to claim 1, wherein the plate-shaped metal members are processed so that a cross-sectional shape is in a recessed shape, and are inserted between the battery cells.

4. The multi-layer structure according to claim 1, wherein a thickness of each plate-shaped metal member is 0.5 mm or more, and a thickness of the heat insulating layer is 1.0 mm or more.

5. The multi-layer structure according to claim 1, wherein:

an additional plate-shaped metal member having a thermal conductivity of 100 W/m·K or more and a thickness of 0.3 mm or more is further present on a side surface in parallel with a direction in which the battery cells are disposed side by side; and the additional plate-shaped metal member is in thermal contact with the side surface of the battery cells, and at least one end portion is in thermal contact with the cooling member.

6. The multi-layer structure according to claim 1, wherein a spacing between the battery cells is 1.5 to 5.0 mm.

7. The multi-layer structure according to claim 1, wherein each plate-shaped metal member and the cooling member are in thermal contact with each other with an adhesive or grease having a thermal conductivity of 1.0 W/m·K or more therebetween.

8. The multi-layer structure according to claim 7, wherein the adhesive or the grease having the thermal conductivity of 1.0 W/m·K or more is an adhesive or grease cured at normal temperature.

9. The multi-layer structure according to claim 1, wherein:

the cooling member is provided with a groove portion; and each plate-shaped metal member is fitted into the groove portion.

10. The multi-layer structure according to claim 1, wherein the square-shaped battery cells are constituted by stacking laminate-type battery cells.

11. The multi-layer structure according to claim 1, wherein a material of each plate-shaped metal member is at least any of aluminum, an aluminum alloy, copper, and a copper alloy.

12. A battery module comprising the multi-layer structure according to claim 1.

13. A battery pack comprising the multi-layer structure according to claim 1.

14. A structure between two square-shaped battery cells disposed side by side so that side surfaces of each of the two battery cells face each other, the battery cells adjacent to each other, the structure comprising:

two plate-shaped metal members each having a thermal conductivity of 100 W/m·K or more and a thickness of 0.3 mm or more, and each being in thermal contact with a respective facing side surface of each of the battery cells, and a heat insulating layer disposed between the two plate-shaped metal members in thermal contact with the respective facing side surface of each of the battery cells, and having at least either a heat insulating member or a gas layer having a thermal conductivity of 1.0 W/m·K or less and a thickness of 0.5 mm or more, wherein a structural arrangement of the multi-layer structure is: battery cell/plate-shaped metal member/heat insulating layer/plate-shaped metal member/battery cell, the cooling structure further comprising a cooling member being in thermal contact with the battery cells, or being present in a vicinity of the battery cells, wherein:

at least one end portion of each of the plate-shaped metal members is in thermal contact with the cooling member; and the two plate-shaped metal members have a similar thermal conductivity and thickness, and a thickness ratio of plate-shaped metal member/heat insulating layer/plate-shaped metal member is 1.0:0.2 to 4.0:1.0, wherein the plate-shaped metal members are in a substantially recessed shape by connecting lower portions of the plate-shaped metal members in thermal contact with respective side surfaces of heat insulating members adjacent to each other;

the plate-shaped metal members in the substantially recessed shape are inserted between the adjacent heat insulating members; and a battery cell is disposed in the recess in the substantially recessed shape.

15. A multi-layer structure comprising two square-shaped battery cells disposed side by side so that side surfaces of each of the two battery cells face each other, and a cooling structure between the battery cells, wherein the cooling structure between the battery cells comprises:

two plate-shaped metal members each having a thermal conductivity of 100 W/m·K or more and a thickness of 0.3 mm or more, and each being in thermal contact with a respective facing side surface of each of the battery cells, and a heat insulating layer disposed between the two plate-shaped metal members in thermal contact with the respective facing side surface of each of the battery cells, and having at least either a heat insulating member or a gas layer having a thermal conductivity of 1.0 W/m·K or less and a thickness of 0.5 mm or more, wherein a structural arrangement of the multi-layer structure is: battery cell/plate-shaped metal member/heat insulating layer/plate-shaped metal member/battery cell, the cooling structure further comprising a cooling member being in thermal contact with the battery cells, or being present in a vicinity of the battery cells, wherein:

at least one end portion of each of the plate-shaped metal members is in thermal contact with the cooling member; and the two plate-shaped metal members have a similar thermal conductivity and thickness, and a thickness ratio of plate-shaped metal member/heat insulating layer/plate-shaped metal member is 1.0:0.2 to 4.0:1.0, wherein the plate-shaped metal members are processed so that a cross-sectional shape is in a recessed shape, and are inserted between the battery cells.

16. The multi-layer structure according to claim 15, wherein a side surface of each of the battery cells comprises an iron and steel material, a heat resistance at a contact interface between a battery cell among the two battery cells and a respective plate-shaped metal member is defined as Rs, and a heat resistance of the respective plate-shaped metal member is defined as Rm, and $Rs/Rm \leq 3.0$.

17. The multi-layer structure according to claim 15, wherein a thickness of each plate-shaped metal member is 0.5 mm or more, and a thickness of the heat insulating layer is 1.0 mm or more.

18. The multi-layer structure according to claim 15, wherein:

an additional plate-shaped metal member having a thermal conductivity of 100 W/m·K or more and a thickness of 0.3 mm or more is further present on a side surface in parallel with a direction in which the battery cells are disposed side by side; and the additional plate-shaped metal member is in thermal contact with the side surface of the battery cells, and at least one end portion is in thermal contact with the cooling member.

19. The multi-layer structure according to claim 15, wherein a spacing between the battery cells is 1.5 to 5.0 mm.

20. The multi-layer structure according to claim 15, wherein each plate-shaped metal member and the cooling member are in thermal contact with each other with an adhesive or grease having a thermal conductivity of 1.0 W/m·K or more therebetween.

21. The multi-layer structure according to claim 20, wherein the adhesive or the grease having the thermal conductivity of 1.0 W/m·K or more is an adhesive or grease cured at normal temperature.

22. The multi-layer structure according to claim 15, wherein:

the cooling member is provided with a groove portion; and each plate-shaped metal member is fitted into the groove portion.

23. The multi-layer structure according to claim 15, wherein the square-shaped battery cells are constituted by stacking laminate-type battery cells.

24. The multi-layer structure according to claim 15, wherein a material of each plate-shaped metal member is at least any of aluminum, an aluminum alloy, copper, and a copper alloy.

25. A battery module comprising the multi-layer structure according to claim 15.

26. A battery pack comprising the multi-layer structure according to claim 15.

27. A cooling structure between two square-shaped battery cells disposed side by side so that side surfaces of each of the two battery cells face each other, the battery cells adjacent to each other, the cooling structure comprising:

two plate-shaped metal members each having a thermal conductivity of 100 W/m·K or more and a thickness of 0.3 mm or more, and each being in thermal contact with a respective facing side surface of each of the battery cells, and a heat insulating layer disposed between the two plate-shaped metal members in thermal contact with the respective facing side surface of each of the battery cells, and having at least either a heat insulating member or a gas layer having a thermal conductivity of 1.0 W/m·K or less and a thickness of 0.5 mm or more, wherein a structural arrangement of the multi-layer structure is: battery cell/plate-shaped metal member/heat insulating layer/plate-shaped metal member/battery cell, the cooling structure further comprising a cooling member being in thermal contact with the battery cells, or being present in a vicinity of the battery cells, wherein:

at least one end portion of each of the plate-shaped metal members is in thermal contact with the cooling member; and the two plate-shaped metal members have a similar thermal conductivity and thickness, and a thickness ratio of plate-shaped metal member/heat insulating layer/plate-shaped metal member is 1.0:0.2 to 4.0:1.0, wherein the plate-shaped metal members are processed so that a cross-sectional shape is in a recessed shape, and are inserted between the battery cells.

* * * * *